(12) United States Patent
Hoeper et al.

(10) Patent No.: US 12,528,320 B2
(45) Date of Patent: Jan. 20, 2026

(54) CAM-ACTUATED LIFT ASSIST FOR TOW BAR ACTIVATED BRAKE SYSTEM

(71) Applicants: John Hoeper, Alexandria, MN (US); Jesse R. Armstrong, Glenwood, MN (US); Garret G. Hoeper, Alexandria, MN (US); Matthew T. Martin, Glenwood, MN (US); Eric M. Olness, Lowry, MN (US); Taylor S. Stulen, Hawick, MN (US); FAST GLOBAL SOLUTIONS, INC., Glenwood, MN (US)

(72) Inventors: John Hoeper, Alexandria, MN (US); Jesse R. Armstrong, Glenwood, MN (US); Garret G. Hoeper, Alexandria, MN (US); Matthew T. Martin, Glenwood, MN (US); Eric M. Olness, Lowry, MN (US); Taylor S. Stulen, Hawick, MN (US)

(73) Assignee: FAST Global Solutions, Inc., Glenwood, MN (US)

( * ) Notice: Subject to any disclaimer, the term of this patent is extended or adjusted under 35 U.S.C. 154(b) by 311 days.

(21) Appl. No.: 18/248,749

(22) PCT Filed: Oct. 13, 2021

(86) PCT No.: PCT/US2021/054865
§ 371 (c)(1),
(2) Date: Apr. 12, 2023

(87) PCT Pub. No.: WO2022/081770
PCT Pub. Date: Apr. 21, 2022

(65) Prior Publication Data
US 2023/0415526 A1    Dec. 28, 2023

Related U.S. Application Data

(60) Provisional application No. 63/252,466, filed on Oct. 5, 2021, provisional application No. 63/144,135, filed
(Continued)

(51) Int. Cl.
*B60D 1/24* (2006.01)
*B60D 1/155* (2006.01)
(Continued)

(52) U.S. Cl.
CPC ............. *B60D 1/242* (2013.01); *B60D 1/155* (2013.01); *B60D 2001/005* (2013.01); *B60T 11/04* (2013.01)

(58) Field of Classification Search
CPC ..................................................... B60D 1/242
See application file for complete search history.

(56) References Cited

U.S. PATENT DOCUMENTS 3,134,461 A * 5/1964 Klemm ..................... B60T 7/20
188/78
3,580,608 A    5/1971 Grant
(Continued)

FOREIGN PATENT DOCUMENTS

DE    917353 C    8/1954
DE    2159709 B2    6/1973
(Continued)

*Primary Examiner* — Kevin Hurley
(74) *Attorney, Agent, or Firm* — Christensen, Fonder, Dardi & Busse PLLC; Timothy J. Busse

(57) ABSTRACT

A lift assist system for lifting a tow bar and setting a tow bar-actuated brake system. The lift assist system includes a cam that may proportionally counter the moments imposed on the tow bar for a reduced and more uniform exertion force on the tow bar throughout the rotation of the tow bar. A brake actuation system can help provide retention of the tow bar in the upright configuration, eliminating the need for
(Continued)

or providing redundancy to conventional latch and hook mechanisms.

20 Claims, 17 Drawing Sheets

Related U.S. Application Data on Feb. 1, 2021, provisional application No. 63/091,077, filed on Oct. 13, 2020.

(51) Int. Cl.
*B60D 1/00* (2006.01)
*B60T 11/04* (2006.01)

(56) References Cited

U.S. PATENT DOCUMENTS

| 4,025,085 | A | 5/1977 | Jacobs |
| 4,057,158 | A | 11/1977 | Lissy |
| 4,317,256 | A | 3/1982 | Senders |
| 6,135,485 | A | 10/2000 | Filbrun |
| 6,293,352 | B1 | 9/2001 | Hundeby et al. |
| 7,011,329 | B2 | 3/2006 | Yoder |
| 8,544,867 | B1 | 10/2013 | Perkins et al. |
| 8,662,522 | B1 | 3/2014 | Hunt |
| 9,744,955 | B1 | 8/2017 | Hoeper et al. |
| 10,106,002 | B2 | 10/2018 | McAllister |
| 10,118,450 | B2 | 11/2018 | Grönholm |
| 2014/0312595 | A1 | 10/2014 | Knowles et al. |
| 2020/0156873 | A1 | 5/2020 | Baer |
| 2023/0415526 | A1 | 12/2023 | Hoeper et al. |

FOREIGN PATENT DOCUMENTS

| DE | 2950119 | A1 | 7/1981 |
| DE | 3035891 | A1 | 4/1982 |
| DE | 19637228 | C1 | 4/1998 |
| DE | 19957499 | A1 | 6/2001 |
| DE | 102015108229 | A1 | 12/2016 |
| DE | 102004045699 | B4 | 9/2019 |
| EP | 0030711 | A2 | 6/1981 |
| EP | 732300 | B1 | 1/2000 |
| EP | 2431200 | A1 | 3/2012 |
| EP | 2431200 | B1 | 1/2016 |
| EP | 2692599 | B1 | 2/2016 |
| EP | 3086054 | A1 | 10/2016 |
| EP | 3098093 | A1 | 11/2016 |
| EP | 3406496 | A1 | 11/2018 |
| GB | 764563 | A | 12/1956 |
| GB | 2553636 | A | 3/2018 |
| GB | 2553636 | B | 9/2018 |
| WO | WO2016079377 | A1 | 5/2016 |
| WO | WO2019108912 | A1 | 6/2019 |
| WO | WO2022081770 | A1 | 4/2022 |

* cited by examiner

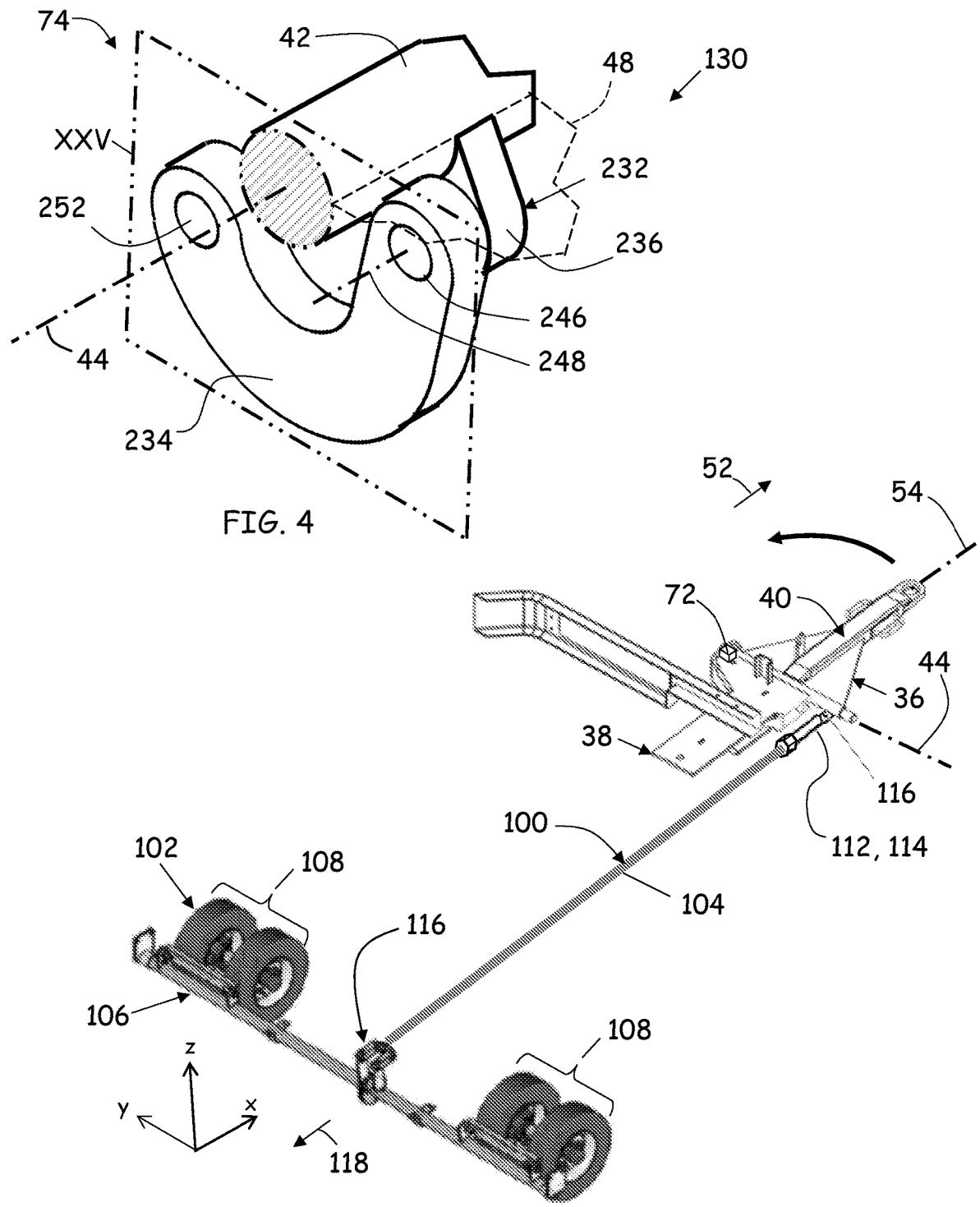

CAM-ACTUATED LIFT ASSIST FOR TOW BAR ACTIVATED BRAKE SYSTEM

RELATED APPLICATIONS

The present application is a National Phase entry of PCT Application No. PCT/US2021/054865, filed on Oct. 13, 2021, which claims the benefit of U.S. Provisional Application No. 63/091,077, filed Oct. 13, 2020, U.S. Provisional Application No. 63/144,135, filed Feb. 1, 2021, and U.S. Provisional Application No. 63/252,466, filed Oct. 5, 2021, the disclosures of which are incorporated by reference herein in their entirety.

FIELD OF THE DISCLOSURE

The present disclosure is directed generally to brake systems for trailers and towed vehicles, and more specifically to tow bar actuated brake systems.

BACKGROUND OF THE DISCLOSURE

Light towed vehicles with tow bar activated brake systems have found utility in various settings, such as baggage carts, mail carts, warehouse dollies, and supply trailers. Tow bar activated brake systems are designed to engage the running gear of the vehicle to provide braking when the towed vehicle is in a parked configuration. The parked configuration is often attained by personnel rotating the tow bar from a substantially horizontal orientation to a substantially vertical orientation.

A characteristic of many tow bar activated brake systems is an increased force requirement as the brakes are engaged, which often occurs as the tow bar approaches or passes through the substantially vertical orientation. The force requirement to set the brake system can be several times greater than the force required to overcome the weight of the tow bar. An improved brake system that reduces the force requirements imposed on operating personnel to lift and set the brake system would be welcomed.

SUMMARY OF THE DISCLOSURE

Various embodiments of the disclosure include a tow bar lift assist system that counters the moment generated by the weight of the tow bar when manipulating the tow bar from the substantially horizontal orientation to the substantially vertical orientation. The force required of the operator as the tow bar is rotated upward can be tailored to suit a particular application. In some embodiments, the disclosed system drives a brake and can be tailored to provide additional assistance to the operator as the brake is set (e.g., as the tow bar approaches and/or passes through the substantially vertical orientation), thereby avoiding the need for excessive forces to be exerted by the operator. Accordingly, the required force exerted by the operator can be reduced and have smaller variation during manipulation of the tow bar.

Various embodiments of the disclosure include a self-securing brake actuation mechanism that secures the braking of the towed vehicle without need for the hook and latch arrangement of conventional tow bar brake systems. The self-securing brake system leverages the tension force exerted on the tow bar by the brake system that maintains tow bar in equipoise when the brakes are set. The self-securing aspect can eliminate the need for or provide redundancy to conventional hook and latch arrangements.

Conventional tow bars and tow bar activated brake systems are known to include lift assist mechanisms that overcome or partially overcome the weight of the tow bar, particularly when the tow bar is in a substantially horizontal configuration. An example of such systems is found at U.S. Pat. No. 7,011,329 to Yoder, the disclosure of which is hereby incorporated by reference herein in its entirety except for patent claims and express definitions contained therein. Many such systems utilize a pre-loaded spring that generates a counter moment about a rotation axis of the tow bar that at least partially counters the weight of the tow bar. The pre-loading of the spring typically generates a maximum counter moment when the tow bar is in the substantially horizontal orientation, which is also where the force requirement to lift the tow bar is typically the greatest. As the tow bar is lifted from the substantially horizontal configuration toward the substantially vertical orientation, the pre-load on the spring is relaxed or generates less of a counter moment, which also corresponds with reduced lifting requirements as the tow bar approaches the substantially vertical orientation.

However, for tow bar activated brake systems, the force required to be exerted by operating personnel is often greatest when setting the brake, e.g., when the tow bar approaches and/or passes through the substantially vertical orientation. The substantially vertical orientation is also where conventional lift assist mechanisms generate the least amount of counter moment, and is of diminished assistance to the operator. The system disclosed herein provides a passive remedy to this scenario.

Structurally, various embodiments of the disclosure include a lift assisted tow bar system comprising a tow bar pivotally coupled to a towed vehicle to define a tow bar rotation axis, the tow bar being articulable about the tow bar rotation axis, a cam coupled with one of the tow bar and the towed vehicle, the cam including a cam surface that at least partially surrounds the tow bar rotation axis, a cam follower assembly, including a cam follower contacting the cam surface and a biasing element coupled to the cam follower, the biasing element generating a cam force vector that is imposed on the cam surface. The cam follower is configured to follow along the cam surface and exert the cam force vector on the cam for generation of a counter-moment that at least partially counters moments encountered about the tow bar rotation axis during operation of the tow bar. The cam surface is configured to vary a counter-moment arm of the counter-moment about the tow bar rotation axis as the cam follower follows along the cam surface. In some embodiments, the lift assisted tow bar system includes a brake system coupled to the tow bar, the brake system being engaged when the tow bar is in a substantially vertical orientation, wherein the cam surface and the biasing element are configured to generate the counter-moment to substantially counter a brake system load moment about the tow bar rotation axis when the brake system is engaged.

In some embodiments, the cam follower assembly includes a follower arm pivotally rotatable about a follower arm pivot axis, the follower arm including a follower end portion that extends from the pivot axis. The tow bar, the follower arm, and the biasing element may be coupled to a steering assembly, the steering assembly being coupled to a running gear of the towed vehicle for steering of the towed vehicle.

In some embodiments, the cam follower assembly includes a housing. The cam follower assembly may include a plunger assembly configured to exert the cam force vector along an actuation axis. In some embodiments, the plunger assembly includes a plunger rod coupled to an extension, the plunger rod extending through the aperture of the centering plate, the extension extending through the centering sleeve, the cam follower being disposed at a distal end of the extension. The biasing element may be a compression spring that surrounds the plunger rod.

An access opening may be defined on a lateral side of the housing, the access opening being dimensioned for passage of the bias element during assembly. In some embodiments, the plunger rod defines a lateral through hole configured to receive a removable pin for seating against the housing. The removable pin is selectively removable from the second lateral through hole to enable the lateral through hole to pass into the housing.

In some embodiments, a spacer shim is disposed adjacent a proximal end of the extension. The spacer shim may be captured between the extension and a distal spring retainer coupled to the compression spring. In some embodiments, the spacer shim is dimensioned to pass into the centering sleeve.

In some embodiments, the cam is in a fixed spatial relationship relative to the tow bar. A mounting flange may be disposed at the distal end of a body of the housing. The mounting flange may define an acute angle relative to the actuation axis. In some embodiments, the centering sleeve is affixed to the mounting flange. In some embodiments, the towed vehicle includes a chassis, the cam being coupled to and in a fixed spatial relationship relative to the chassis. In some embodiments, the towed vehicle includes a steering section and a chassis, the steering section being pivotally coupled to the chassis, the cam being coupled to and in a fixed spatial relationship with the steering section.

Various embodiments of the disclosure include a self-securing brake actuation mechanism, comprising a tow bar pivotally coupled to a towed vehicle, the tow bar including a cross member that defines a tow bar rotation axis and is articulable about the tow bar rotation axis, a yoke assembly that depends from and is in a fixed relationship with the cross member, a contoured link including a first end and a second end, the first end being pivotally coupled to the yoke assembly and defining a yoke pivot axis, and a brake system coupled to and defining a junction with the second end of the contoured link. In a tow bar up configuration, the yoke pivot axis is located forward of and above the tow bar rotation axis, and the contoured link at least partially surrounds the cross member. In some embodiments, when in the tow bar up configuration, the brake system imposes a force that places the contoured link in tension to suspend the contoured link between the junction and the yoke assembly.

Various embodiments of the disclosure comprise a method for retrofitting a towed vehicle with a lift assist device for a tow bar, comprising providing a retrofit kit including a cam and a cam follower assembly and providing installation instructions on a tangible, non-transitory medium, the installation instructions including installing the cam follower assembly on the towed vehicle and installing the cam on the towed vehicle. In some embodiments, the retrofit kit provided in the step of providing a retrofit kit includes a removable pin coupled to the cam follower assembly to maintain the cam follower assembly in the partially retracted configuration. The instructions may include the steps of engaging the cam follower assembly with the cam to extend the removable pin proximally relative to the partially retracted configuration, and disengaging the removable pin from the cam follower assembly. In some embodiments, the retrofit kit includes a replacement tow bar with the cam mounted thereto, the installation instructions include mounting the replacement tow bar to the towed vehicle.

In some embodiments, the method includes mounting the cam follower assembly to a tow bar of the towed vehicle, and mounting the cam to the towed vehicle adjacent the tow bar. The cam follower assembly may include a mounting plate for mounting the cam follower to a tow bar. The mounting plate may define slots for adjusting a position of the cam follower assembly relative to the cam. In some embodiments, the installation instructions include adjusting the position of the cam follower assembly using the slots.

In various embodiments of the disclosure, a lift assisted tow bar system is disclosed, comprising a tow bar pivotally coupled to towed vehicle to define a tow bar rotation axis, the tow bar being articulable about the tow bar rotation axis, and a cam coupled to and in a fixed spatial relationship with the tow bar. The cam includes a cam surface, the cam surface that is oriented for rotation about the tow bar rotation axis. A cam follower assembly includes a follower arm pivotally rotatable about a follower arm pivot axis, the follower arm including a follower end portion that extends from the pivot axis, and a cam follower coupled to the follower end portion of the follower arm and contacting the cam surface. A biasing element is coupled to the follower arm, the biasing element generating a cam force vector that is imposed on the cam surface. The cam follower is configured to follow along the cam surface and exert the cam force vector on the cam, generating a counter-moment that at least partially counters moments encountered about the tow bar rotation axis during operation of the tow bar.

In some embodiments, the cam surface is configured to vary a counter-moment arm of the counter-moment about the tow bar rotation axis as the cam follower follows along the cam surface. The follower arm may include a lever end portion that extends from the follower arm pivot axis, the biasing element being coupled to the lever end portion. The follower end portion defines a follower arm length extending from the follower arm pivot axis to a central axis of the follower, and the lever end portion defines a lever arm length extending from the follower arm pivot axis to an anchoring point of the biasing element on the follower arm. In some embodiments, a ratio of the lever arm length to the follower arm length is in a range of 2:1 to 3:1 inclusive. In some embodiments, the tow bar, the follower arm, and the biasing element are coupled to a steering assembly, the steering assembly being coupled to a running gear of the towed vehicle for steering of the towed vehicle. In some embodiments, the follower arm is a bell crank. The cam follower may be a roller.

In some embodiments, a brake system is coupled to the tow bar, the brake system being engaged when the tow bar is in a substantially vertical orientation, wherein the cam surface and the biasing element are configured to generate the counter-moment to substantially counter a brake system load moment about the tow bar rotation axis when the brake system is engaged.

Various embodiments of the disclosure include a tow bar pivotally coupled to a towed vehicle, the tow bar including a cross member that defines a tow bar rotation axis and is articulable about the tow bar rotation axis. A yoke assembly depends from and is in a fixed relationship with the cross member. A contoured link includes a first end and a second end, the first end being pivotally coupled to the yoke assembly and defining a yoke pivot axis. A brake system is coupled to and defines a junction with the second end of the contoured link In a tow bar up configuration, the yoke pivot axis is located forward of and above the tow bar rotation axis, and the contoured link at least partially surrounds the cross member. Also in the tow bar up configuration, the brake system may impose a force that places the contoured link in tension to suspend the contoured link between the junction and the yoke assembly. In some embodiments, a vector direction axis is defined that passes through the yoke pivot axis and the junction, and in the tow bar up configuration, the vector direction axis extends above the tow bar rotation axis and the contoured link extends below the tow bar rotation axis.

BRIEF DESCRIPTION OF THE DRAWINGS

FIG. 4 is an enlarged, partial sectional view at cutaway inset IV of FIG. 2, depicting a self-securing brake actuation mechanism according to an embodiment of the disclosure;

FIG. 5 is a perspective, partial cutaway view of a brake system of the towed vehicle of FIG. 1 according to an embodiment of the disclosure;

DETAILED DESCRIPTION OF THE DRAWINGS

Figure 1:
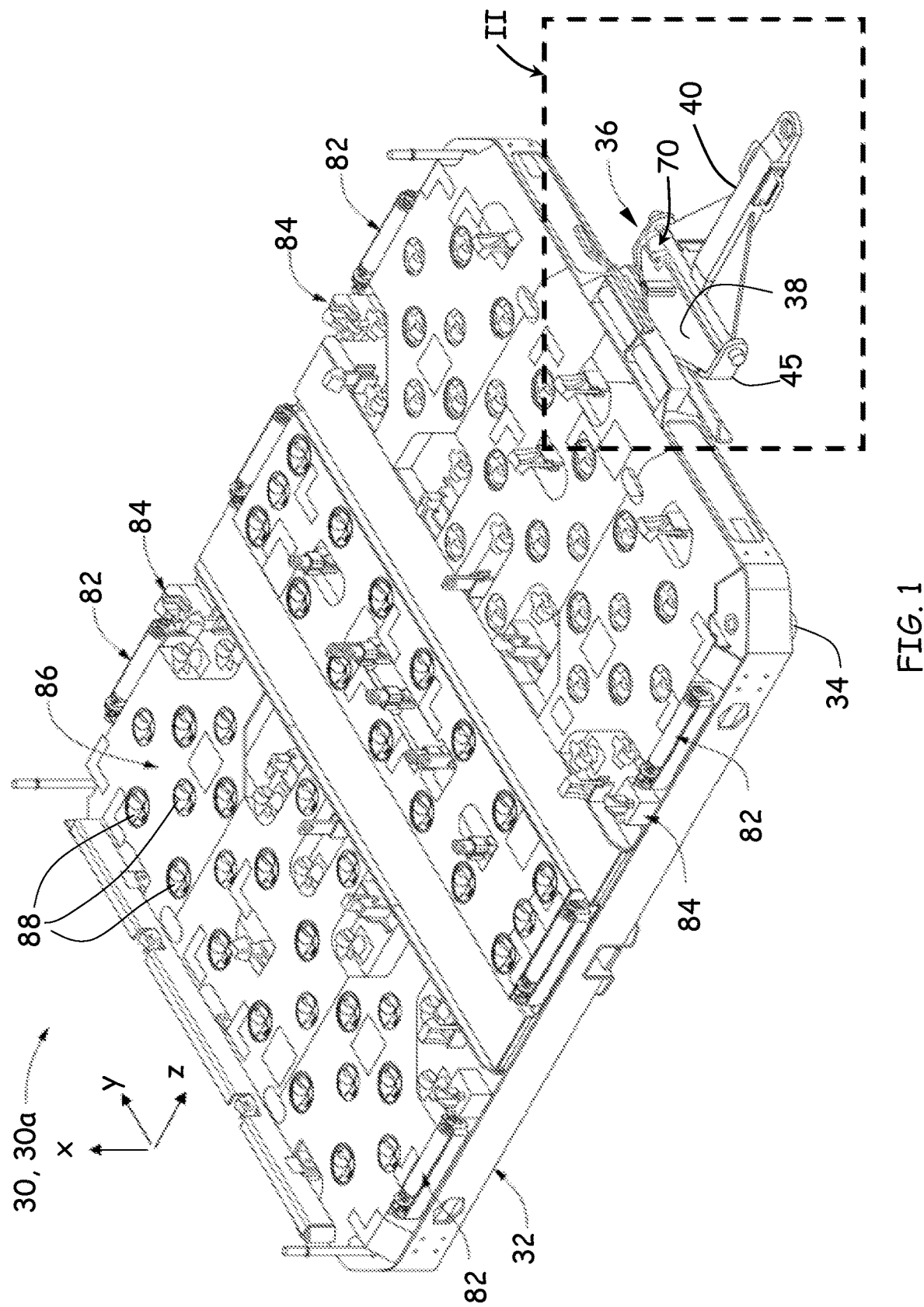
FIG. 1 is a perspective view of a towed vehicle according to an embodiment of the disclosure.
Figure 2:
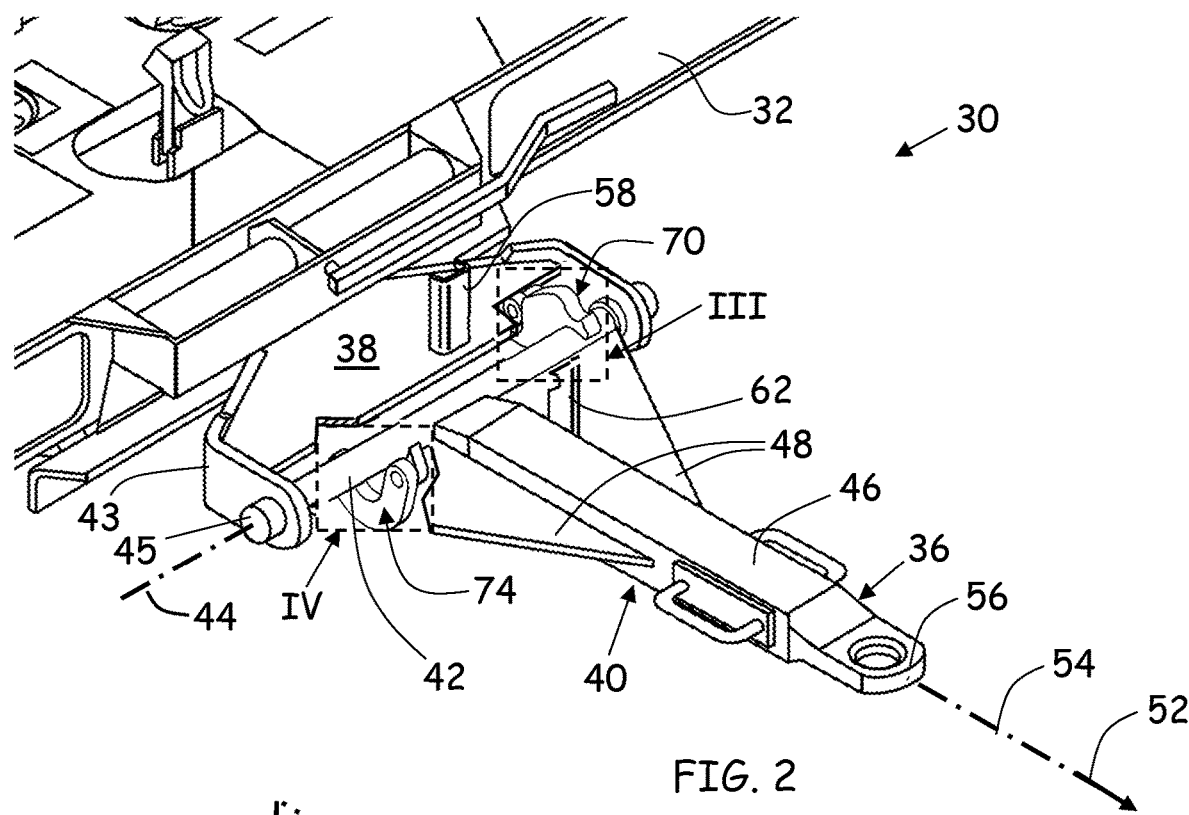
FIG. 2 is an enlarged view at inset II of FIG. 1 depicting a tow bar assembly of the towed vehicle according to an embodiment of the disclosure.
Figure 3:
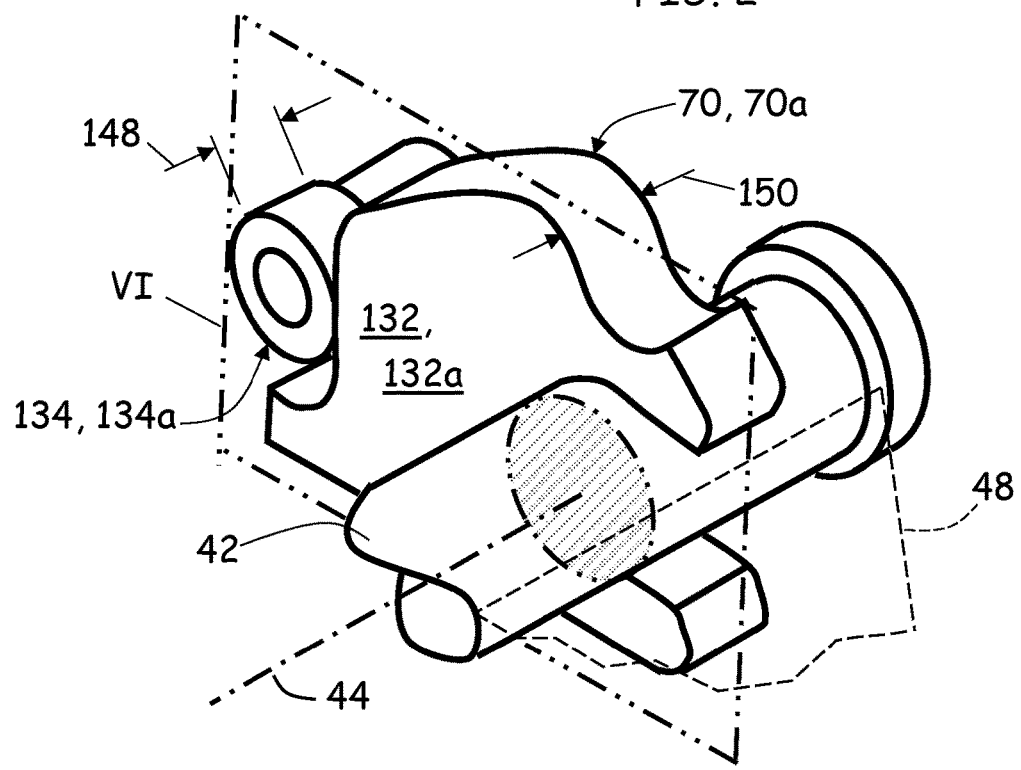
FIG. 3 is an enlarged, partial sectional view at inset III of FIG. 2 depicting a lift assist mechanism of the tow bar assembly according to an embodiment of the disclosure.

Referring to FIGS. 1 through 4, a towed vehicle 30 is depicted according to an embodiment of the disclosure. The towed vehicle 30 includes a chassis 32 and a running gear 34 coupled to a tow bar assembly 36. The tow bar assembly 36 may include a steering portion 38 that is pivotally mounted to the chassis 32 and coupled to the running gear 34 for steering of the towed vehicle 30. The tow bar assembly 36 includes a tow bar 40 with a cross member 42 that defines a substantially horizontal rotation axis 44. The cross member 42 may be a hollow tube supported by a pivot pin 43. In some embodiments, the pivot pin 43 is supported by cantilevers 45 that extend from the steering portion 38, as depicted in FIGS. 1 and 2. In some embodiments, the cantilevers extend directly from the chassis 32. The tow bar 40 may include a tongue 46 and gusset plates 48 that extend from the tongue 46 to the cross member 42. The tongue 46 defines a tongue axis 54 and extends in a forward direction 52 from the cross member 42 to a free end 56 of the tow bar 40. Herein, "forward" refers to a direction in which the towed vehicle 30 is towed. "Rearward" refers to a direction that is opposite the forward direction.

In some embodiments, the tow bar assembly 36 includes a latch bar 58 that extends from the steering portion 38 and a latch hook 62 attached to the tow bar 40 for securing the tow bar 40 in an upright or parked configuration. In such latched embodiments, the latch hook 62 engages the latch bar 58 when the tow bar 40 is in the upright configuration to secure the tow bar 40 in the upright position.

The tow bar assembly 36 also includes a cam-actuated lift assist mechanism 70. The cam-actuated lift assist mechanism 70 may be contained in a housing 72 (FIG. 5), which is removed from FIGS. 1 through 3 for clarity. In some embodiments, the tow bar assembly 36 includes a self-securing brake actuation mechanism 74. The self-securing brake actuation mechanism 74 is depicted in a cutaway view at inset IV of FIG. 2.

The towed vehicle 30 depicted in FIGS. 1 and 2 is a steerable cargo dolly 30a. The cargo dolly 30a may include self-braking rollers 82, retractable vertical stops 84, and modular decking 86 with unidirectional rollers 88. Various aspects that may be incorporated into the cargo dolly 30a are described in detail at U.S. patent application Ser. No. 16/751,595 to Hoeper et al., filed Jan. 24, 2020, International Publication No. WO 2019/108912 to Hoeper et al., published Jun. 6, 2019, U.S. Patent Application Publication No. 2020/0156873 to Baer, published May 21, 2020, and U.S. Provisional Patent Application No. 63/252,445 to Venem, filed Oct. 5, 2021, all owned by the owner of the present application, the disclosures of which are hereby incorporated by reference herein in their entirety except for patent claims and express definitions contained therein. The depiction of the cargo dolly 30a as the towed vehicle 30 on which the tow bar assembly 36 is utilized is non-limiting. That is, the tow bar assembly 36 may be implemented on other towed vehicles, such as but not limited to baggage carts, mail carts, and supply trailers, for aircraft ground support equipment as well as other purposes.

Herein, a plurality of cam-actuated lift assist mechanism 70 are disclosed and depicted, referred to collectively or generically by reference character 70 and individually by reference character 70 followed by a letter suffix (e.g., cam-actuated lift assist mechanisms of FIGS. 6 through 9 and 70b of FIGS. 10 through 13). The cam-actuated lift assist mechanism 70a is depicted and described at FIGS. 1 through 9 in the context of steerable towed vehicles 30, with the cam follower assembly 134a being anchored to the steering portion 38.

The cam-actuated lift assist mechanism 70a may be utilized on towed vehicles 30 that do not have a steering portion 38, for example, where the tow bar 40 is pivotally mounted to a structure that is in a fixed relationship with the chassis 32, such as depicted with the standard cargo dolly 30b at FIGS. 10 through 13. In such an arrangement, the cam follower assembly 134a is coupled in a fixed relationship with the chassis 32. The skilled artisan, in light of the present disclosure, understands that the cam-actuated lift assist mechanism 70a may be utilized with towed vehicles 30 that do not have a steering portion.

Referring to FIG. 5, a brake system 100 as coupled to the tow bar assembly 36 and a rear portion 102 of the running gear 34 is depicted according to an embodiment of the disclosure. The brake system 100 includes a tie rod 104 that is coupled to and extends rearward from the tow bar assembly 36 to a brake assembly 106 that acts on rear tires 108 of the running gear 34. The brake system 100 includes a biased return 112 for disengaging the brake assembly 106 from the rear tires 106 when the brake is released. In some embodiments, the biased return 112 is a spring module 114 located at a forward end 116 of the tie rod 104, the tie rod 104 being of sufficient stoutness to actuate the brake assembly 106 in a rearward direction 118. Alternatively, the brake system 100 may include a cable (not depicted) instead of a tie rod 104. Also, the biased return 112 may be located on the brake system 100 at a location other than the tie rod 104 and may be other than the spring module 114. In some embodiments, the brake system 100 includes a linkage assembly 116 that enables differential rotation of the brake assembly 106. The differential rotation structure and function is described in detail at U.S. Pat. No. 9,744,955 to Hoeper et al., owned by the owner of the current application and the disclosure of which is incorporated by reference herein in its entirety except for patent claims and express definitions contained therein.

Figure 6:
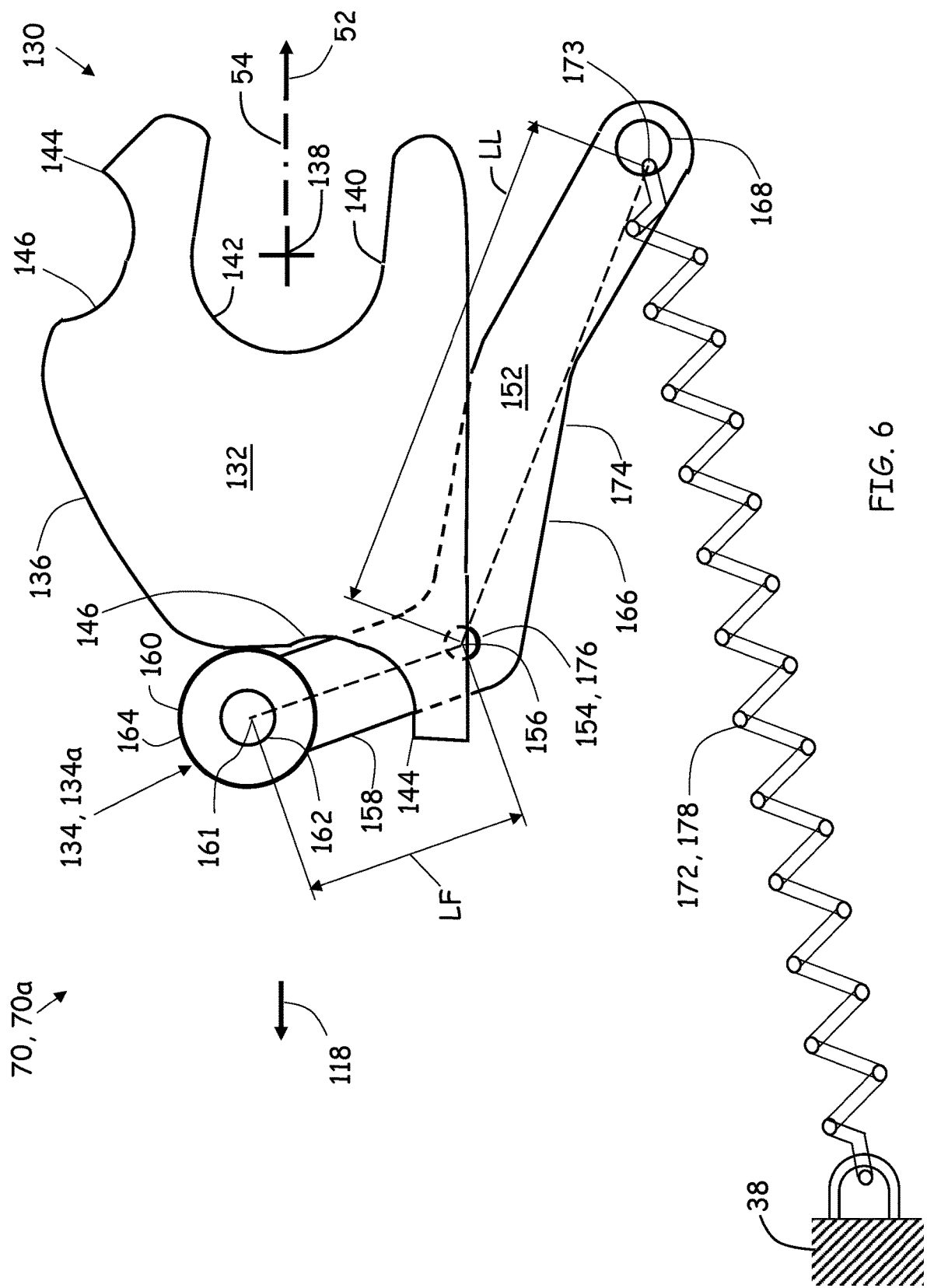
FIG. 6 is a side elevational view of the lift assist mechanism as seen at plane VI of FIG. 3 and with the towed vehicle in a towing configuration, according to an embodiment of the disclosure.

Referring to FIG. 6, a cam-actuated lift assist mechanism 70a is depicted according to an embodiment of the disclosure. In FIG. 6, the cam-actuated lift assist mechanism 70a is depicted in a towing configuration 130, i.e., with the tongue axis 54 in a substantially horizontal orientation. The cam actuated lift assist mechanism 70a includes a cam 132, 132a that is coupled to the cross member 42 (FIG. 7) and a cam follower assembly 134 coupled to the steering portion 38. The cam 132 includes a cam surface 136 that is oriented for rotation about a cam rotation axis 138, the cam rotation axis 138 being substantially coincident with the rotation axis 44 of the cross member 42 in assembly. In some embodiments, the cam 132 defines a cam slot 140 configured to accept the cross member 42 of the tow bar 40. The cam slot 140 may define an arcuate perimeter 142 for registration of the cam 132 against the cross member 42.

Herein, cams and cam follower assemblies are referred to generically or collectively by reference character 132 and 134, respectively, and individually with a letter suffix (e.g., "cam 132a" and "cam follower assembly 134a"). In one embodiment, a cam follower assembly 134a includes a follower arm 152 that is rotatable about a pivot 154, the pivot 154 defining a follower arm pivot axis 156. The follower arm 152 includes a follower end portion 158 that extends from the pivot 154 to a follower 160. A follower arm length LF is defined as the distance between the follower arm pivot axis 156 and a central axis 161 of the follower 160. In some embodiments, the follower 160 is an assembly that includes a pin 162 and a roller 164, the roller 164 being rotatable about the central axis 161.

Figure 9:
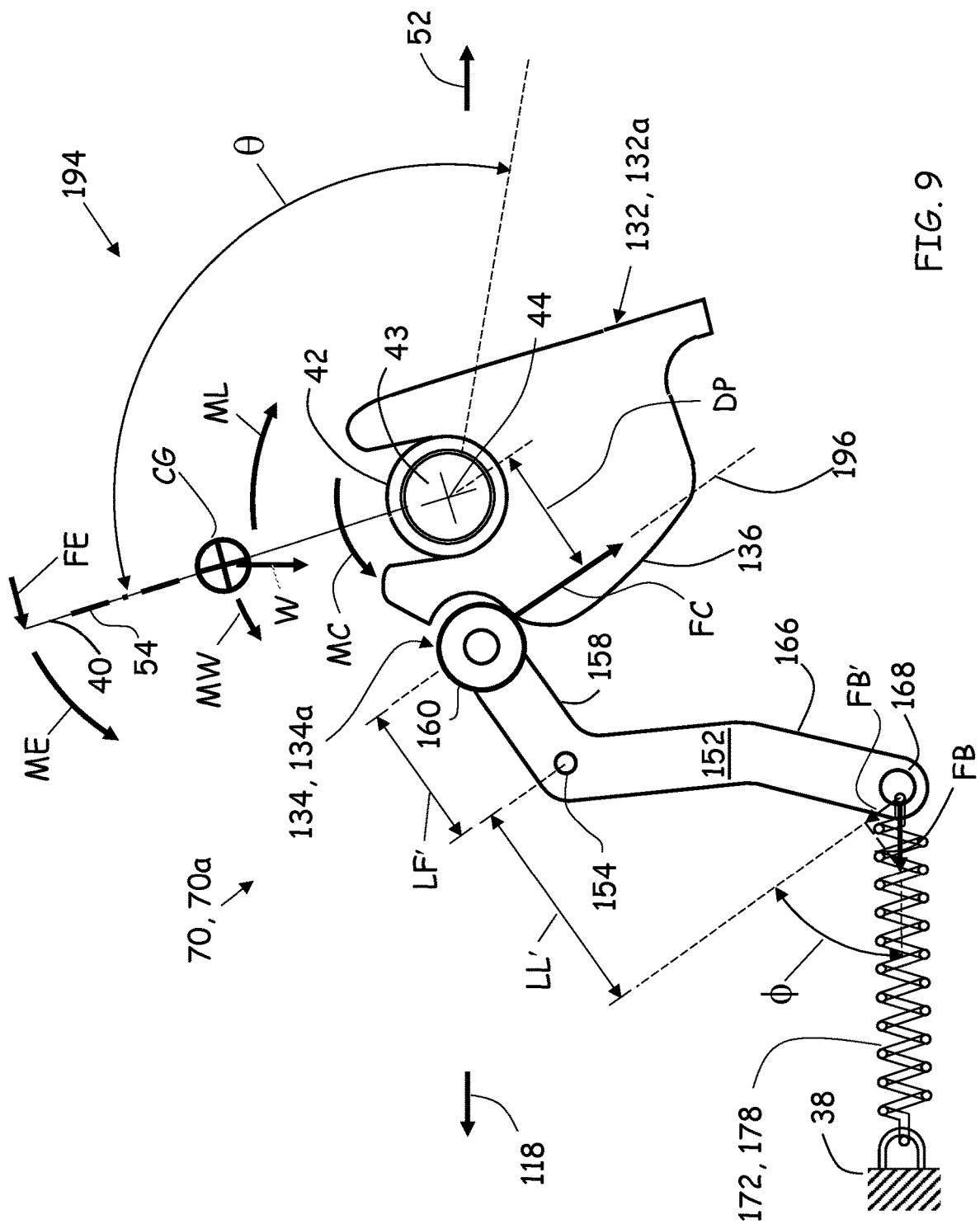
FIG. 9 is a force schematic of the lift assist mechanism of FIG. 6 with the tow bar in a tow bar up configuration according to an embodiment of the disclosure.
Figure 10:
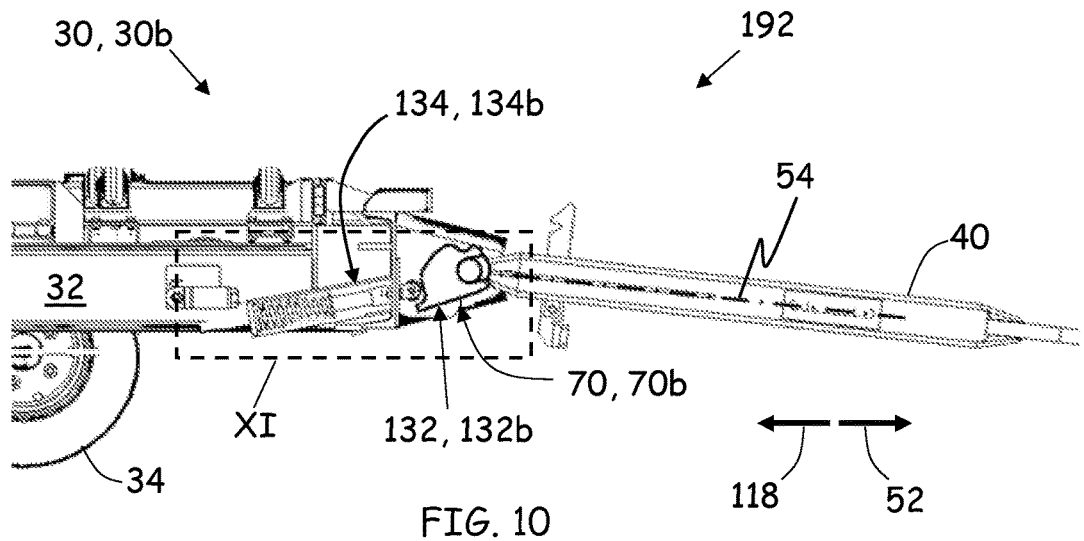
FIG. 10 is a partial sectional view of a towed vehicle with a tow bar lift assist mechanism in a tow bar down configuration according to an embodiment of the disclosure.
Figure 11:
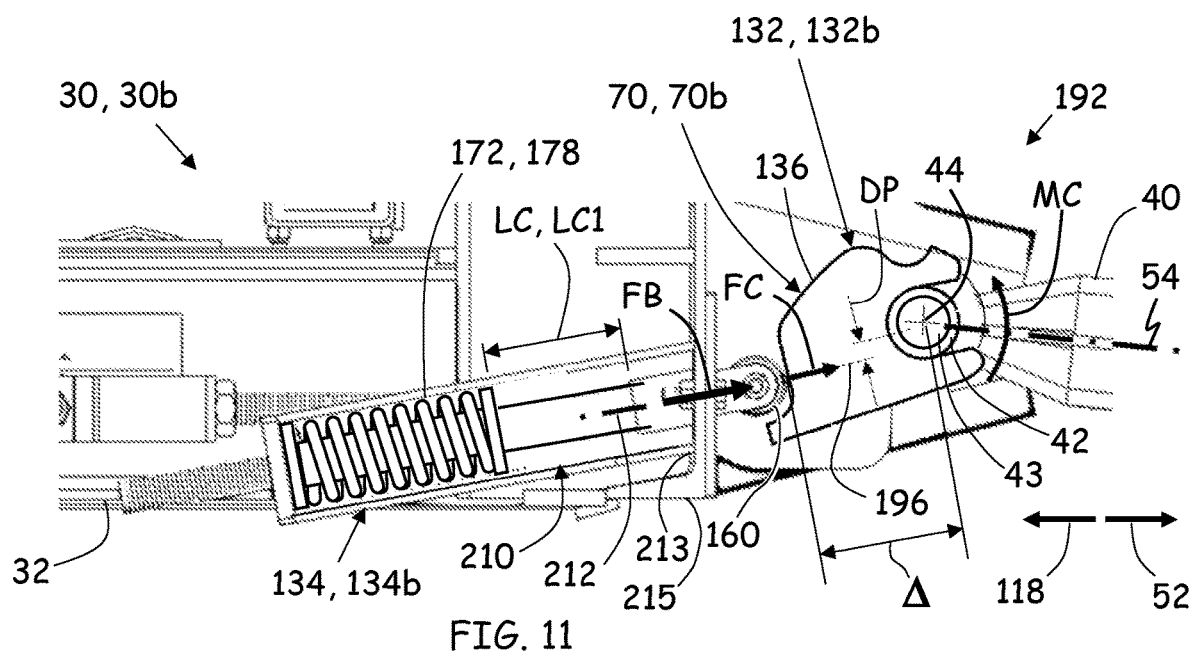
FIG. 11 is an enlarged, partial section view at inset XI of FIG. 10 according to an embodiment of the disclosure.
Figure 12:
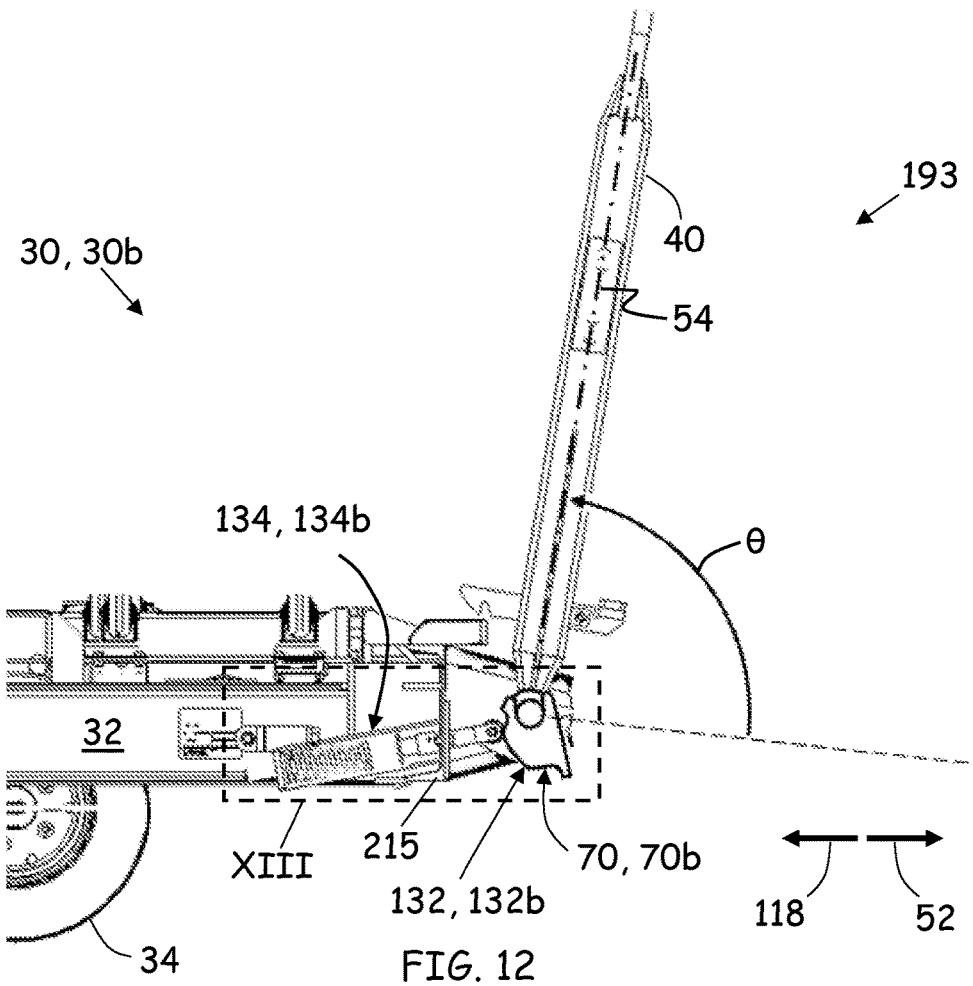
FIG. 12 is a partial sectional view of a towed vehicle with a tow bar lift assist mechanism in an intermediate tow bar configuration according to an embodiment of the disclosure.
Figure 13:
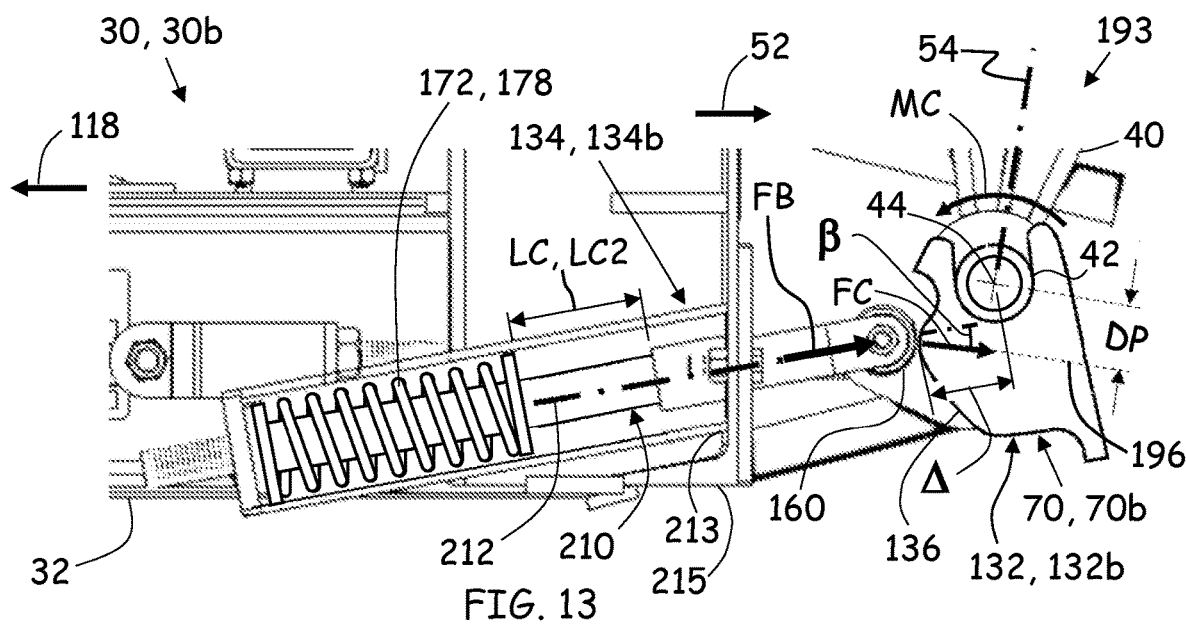
FIG. 13 is an enlarged, partial section view at inset XIII of FIG. 12 according to an embodiment of the disclosure.
Figure 14:
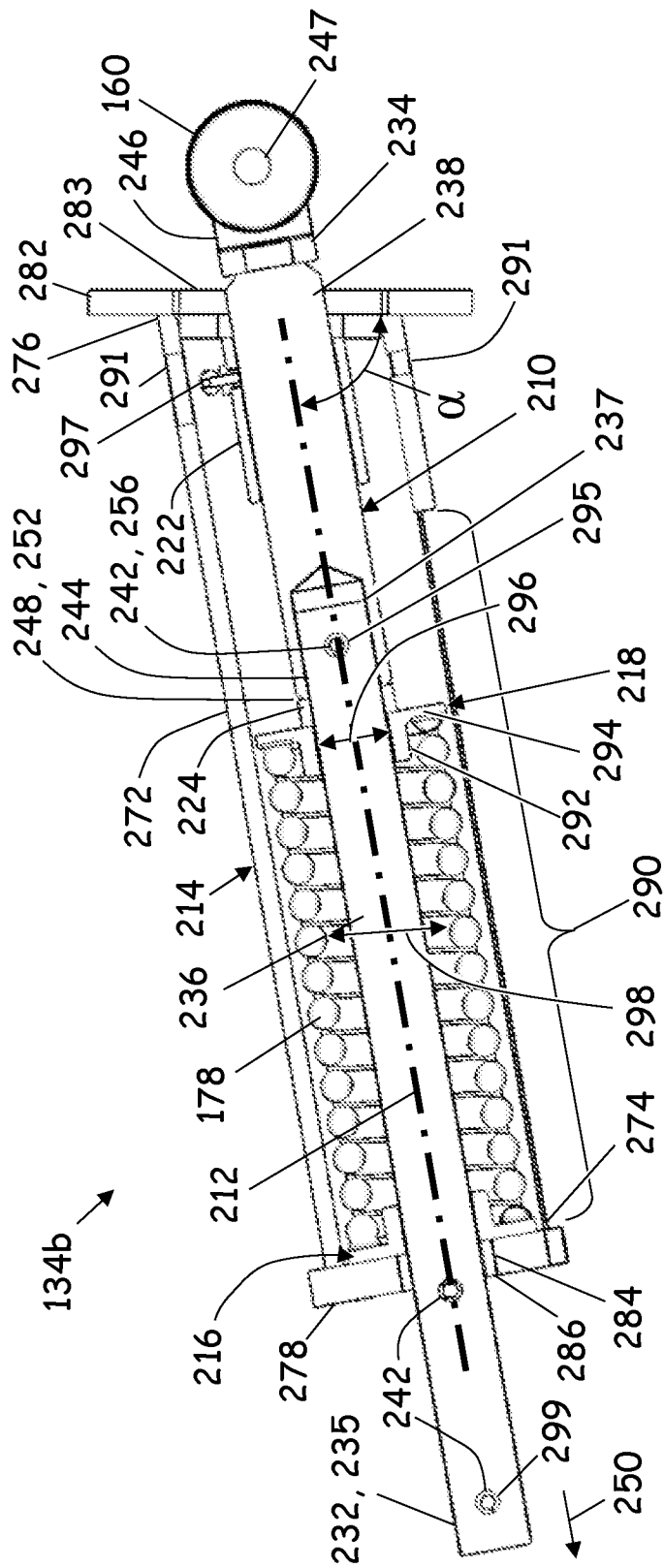
FIG. 14 is a sectional view of a cam follower assembly according to an embodiment of the disclosure.

In some embodiments, stops 144 are defined at the terminations of the cam surface 136. The cam surface 136 may define one or more arcuate depressions 146. The arcuate depressions 146 may be positioned on the cam surface 136 to engage the cam follower 160 when the tow bar is in a tow bar down configuration 192 (FIG. 7) or a tow bar up configuration 194 (FIG. 9). In some embodiments, the cam follower 160 defines a lateral width 148 and the cam 132, 132a defines a thickness 150. The lateral width 148 may be greater than, less than, or equal to the cam thickness 150. In some embodiments, a ratio of the lateral width 148 to the thickness 150 is in a range from 1:1 to 2:1 inclusive; in some embodiments, in a range from 1:1 to 3:2 inclusive. In some embodiments, a ratio of the thickness 150 to the lateral width 148 is in a range from 1:1 to 2:1 inclusive; in some embodiments, in a range from 1:1 to 3:2 inclusive.

Functionally, the stops 144 prevent the cam follower 160 from sliding or rolling off the cam surface 136. The arcuate depressions 146 provide affirmative registration of the cam follower 160 when the tow bar is in the tow bar down configuration 192 or the tow bar up configuration 194. The registration can provide affirmative feedback that the operator senses when the tow bar is in the tow bar up or tow bar down configurations 194, 192. The stops 144 and arcuate depressions 146 are depicted only in FIG. 6, but may be incorporated for any of the cams 132 depicted or described herein. The non-unity ratios of the cam thickness 150 to the lateral width 148 of the follower 160 (and vice-versa) can provide a greater margin for aligning the cam follower assembly 134 with the cam 132, for example in a retrofit scenario. Retrofitting is discussed attendant to FIGS. 20 through 23.

The follower arm 152 may include a lever end portion 166 that extends from the pivot 154 to an eye 168. The cam follower assembly 134a includes a biasing element 172 that is coupled to the follower arm 152 and anchored to the steering portion 38 of the tow bar assembly 36. A lever arm length LL is defined as the distance between the follower arm pivot axis 156 and an anchoring point 173 of the biasing element 172. For the depicted embodiment, the anchoring point 173 is where the biasing element 172 engages the eye 168 of the lever end portion 166. In the depicted embodiment, the follower arm 152 is a bell crank 174, where the follower arm length LF and the lever arm length LL intersect at the follower arm pivot axis 156 to define an apex 176. In some embodiments a ratio of the lever arm length LL to the follower arm length LF is in a range of 2:1 to 3:1 inclusive. Herein, a range that is said to be "inclusive" includes the end point values of the stated range. In the depicted embodiment, the biasing element 172 is a coil spring 178 that is coupled to the follower arm 152 at the eye 168 of the lever end portion 166. Other shapes besides the bell crank 174 are contemplated for the follower arm, for example, a linear member (not depicted). Also, other biasing arrangements are contemplated as an alternative or supplement to the coil spring 178, for example, a torsion spring (not depicted) about the follower arm pivot axis 156.

Figure 7:
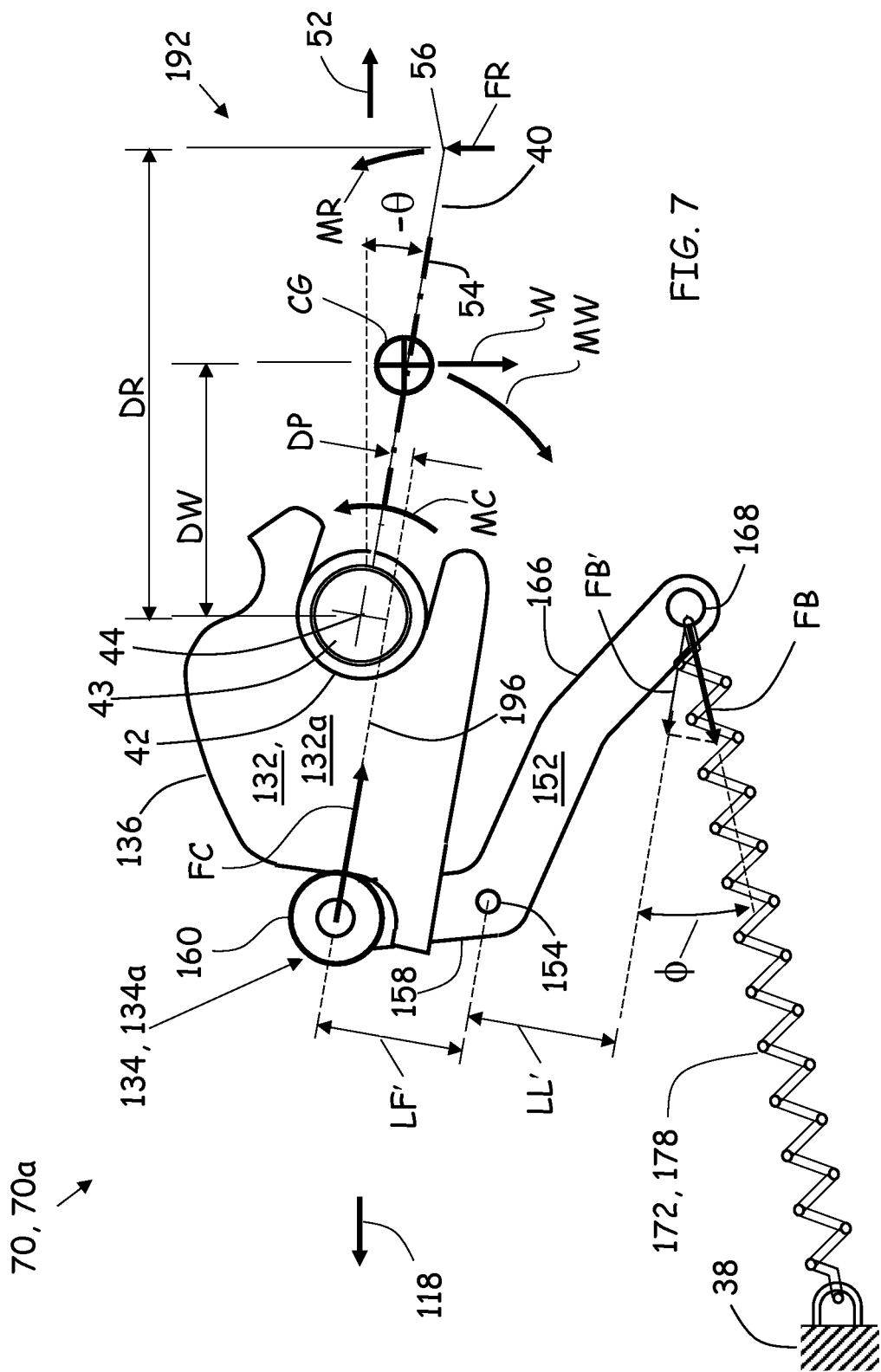
FIG. 7 is a force schematic of the lift assist mechanism of FIG. 6 with the tow bar in a tow bar down configuration according to an embodiment of the disclosure.
Figure 8:
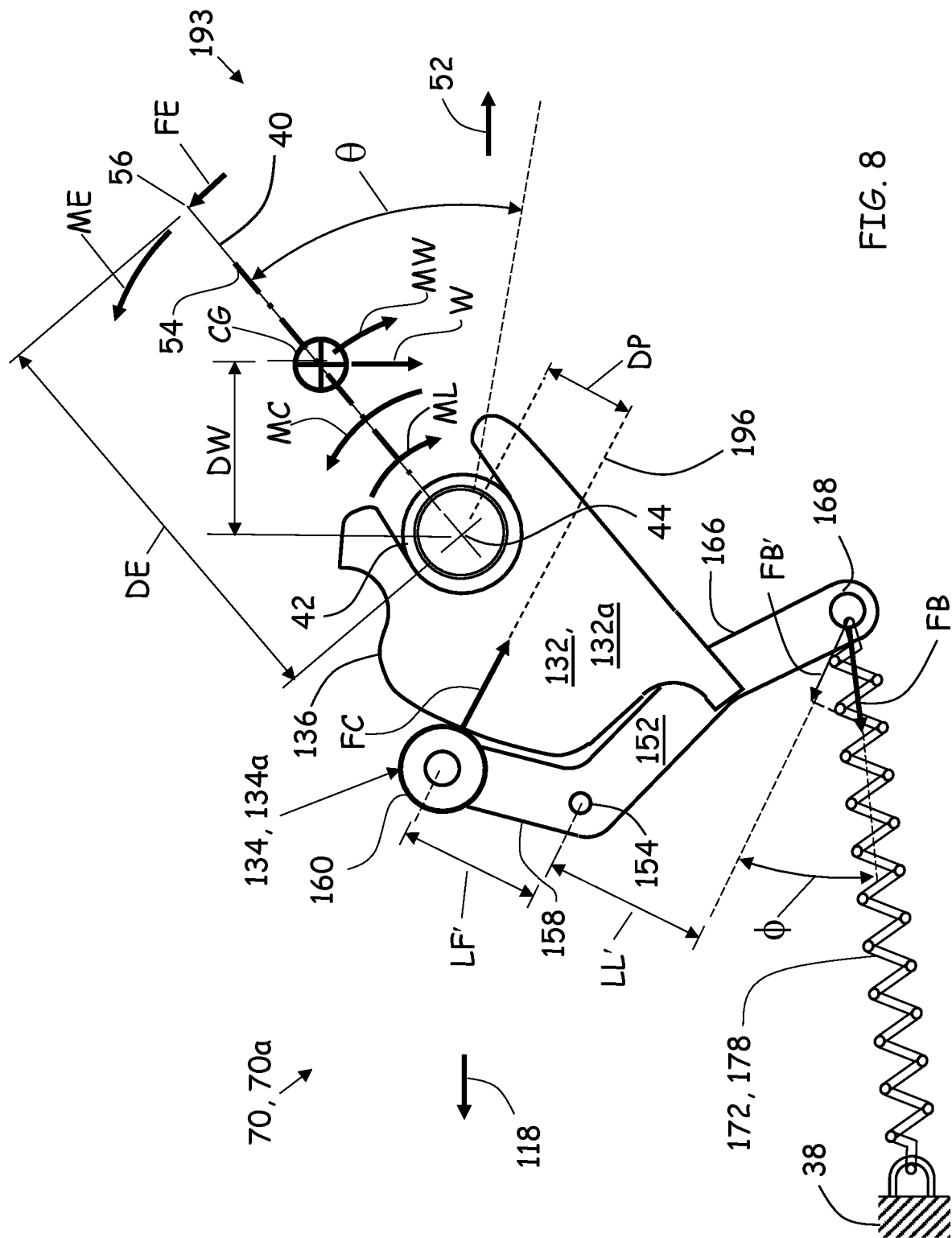
FIG. 8 is a force schematic of the lift assist mechanism of FIG. 6 with the tow bar in an intermediate orientation according to an embodiment of the disclosure.

Referring to FIGS. 7 through 9, operation of the cam-actuated lift assist mechanism 70*a* is depicted according to an embodiment of the disclosure. The FIGS. 7 through 9, include force and moment vectors that are exerted on the cam-actuated lift assist mechanism during operation. In FIG. 7, the cam-actuated lift assist mechanism 70*a* is depicted in a tow bar down configuration 192, i.e., with the tongue axis 54 angled downward at a negative elevation angle $-\theta$ from horizontal to represent the tow bar 40 at rest on the ground. In FIG. 9, the cam-actuated lift assist mechanism 70*a* is depicted in a parked or tow bar up configuration 194, i.e., with the tongue axis 54 angled upward at a maximum elevation angle $\theta$max to represent the tow bar 40 in an upright or parked configuration. In FIG. 8, the cam-actuated lift assist mechanism 70*a* is depicted in an intermediate tow bar configuration 193 at an interim elevation angle $\theta$ that is between the negative elevation angle $-\theta$ and the maximum elevation angle $\theta$max, i.e., with the tongue axis 54 between the tow bar down and tow bar up configurations 192 and 194.

In FIG. 7, a weight W of the tow bar 40 is represented at a center of gravity CG along the tongue axis 54, the weight W causing a weight moment MW about the rotation axis 44 that is a product of the weight W and a horizontal distance DW from the center of gravity CG and the rotation axis 44. The weight moment MW is at least partially countered by a reaction moment MR that is a product of a reaction force vector FR at the free end 56 of the tow bar and a horizontal distance DR from the free end 56 to the rotation axis 44.

The biasing element 172 exerts a biasing force vector FB at the eye 168 of the lever end portion 166 of the follower arm 152. The follower arm 152 reacts to the biasing force vector FB by exerting a cam force vector FC at the cam follower 160 against the cam 132, 132*a*. A trajectory 196 of the cam force vector FC may extend past the rotation axis 44 at a perpendicular distance DP relative to the rotation axis 44. In some embodiments (e.g., for the pin 162 and roller 164 depicted), the trajectory 196 is normal to the cam surface 136 at the contact of the cam follower 160. A cam follower moment MC is imposed on the cross member 42 about the rotation axis 44, the cam follower moment MC being a product of the cam force vector FC and the distance DP. In some embodiments, the cam force vector FC is greater than the biasing force vector FB because of a mechanical advantage provided by the length and direction of the lever end portion 166.

In some embodiments, the biasing element 172, 178 is configured to exert a biasing force FB that is in a range of 150 Newtons to 350 Newtons inclusive when the tow bar assembly 36 is in the tow bar down configuration 192. In some embodiments, a spring constant of the biasing element 172, 178 is in a range of 3 to 10 Newtons per millimeter inclusive.

Mechanical advantage is realized when a projected lever arm length LL' as projected in the trajectory 196 of the cam force vector FC is greater than a projected follower length LF' in the trajectory 196, that is, when a ratio of LL' to LF' is greater than 1. The ratio of LL' to LF' is herein referred to as a projection ratio. For the bell crank 174, the projection ratio may vary with the trajectory 196 of the cam force vector FC, providing another parameter for tailoring the cam follower moment MC.

In some embodiments, the cam follower moment MC (clockwise in FIGS. 7 through 9) at least partially counters the weight moment MW (counterclockwise in FIGS. 7 through 9) when in the tow bar down configuration 192, thereby reducing the reaction moment MR (counterclockwise in FIGS. 7 through 9) and the attendant reaction force vector FR. Arranging the cam-actuated lift assist mechanism 70 so that the trajectory 196 of the cam force vector FC passes substantially through the rotation axis 44 is also contemplated, thereby reducing the perpendicular distance DP and subsequent cam follower moment MC to substantially zero so that the weight moment MW of the tow bar 40 is countered only by the reaction moment MR.

Figure 15:
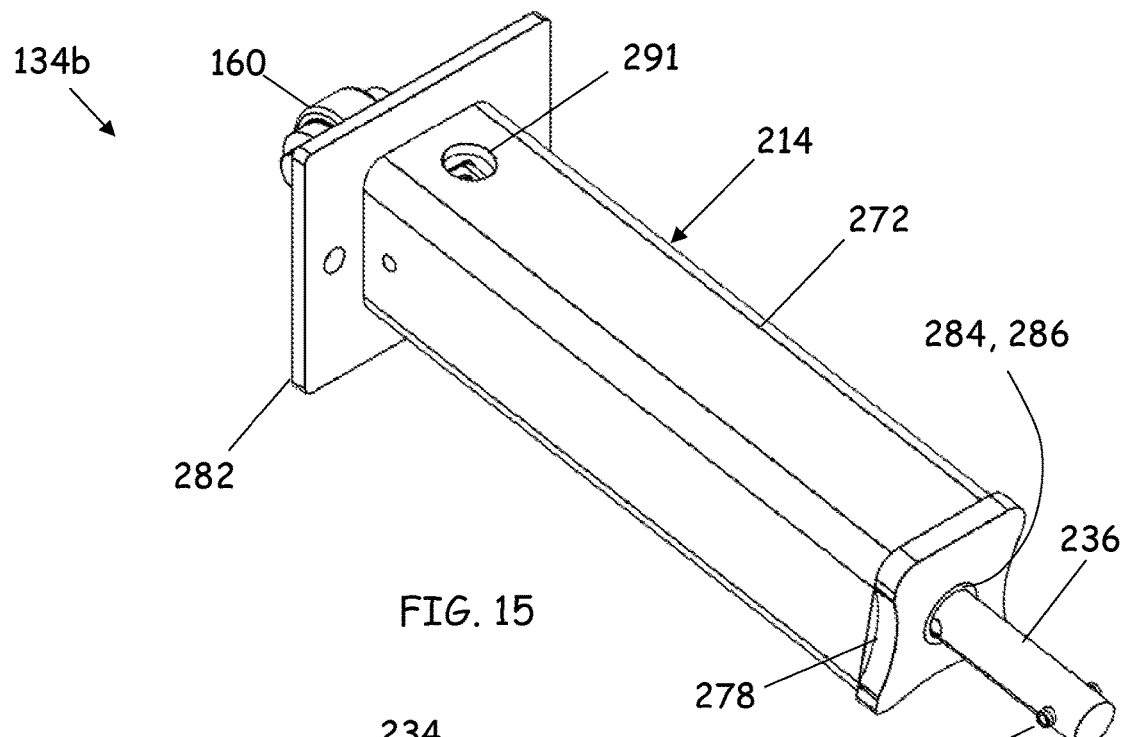
FIGS. 15 and 16 are perspective views of the cam follower assembly of FIG. 14 according to an embodiment of the disclosure.
Figure 16:
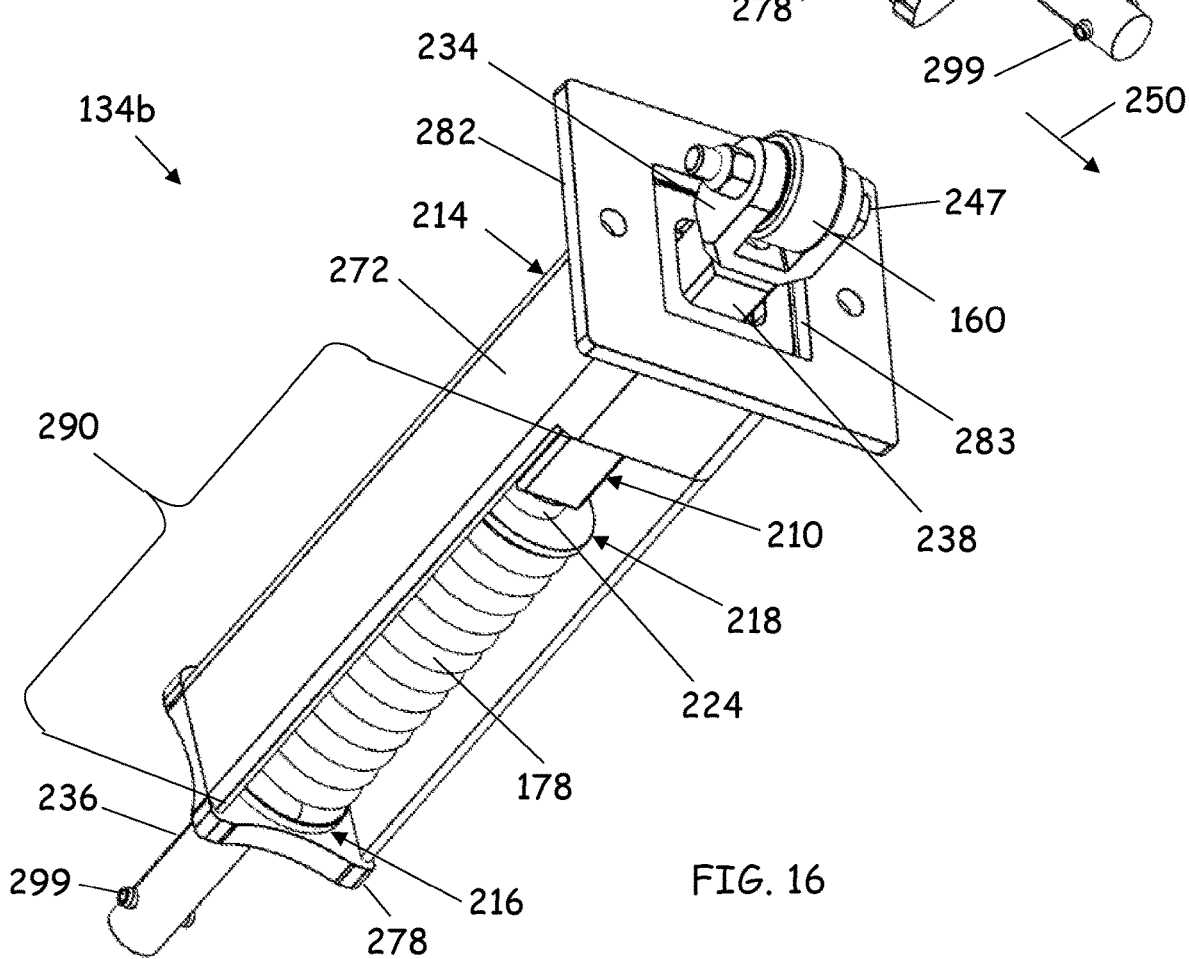
Figure 17:
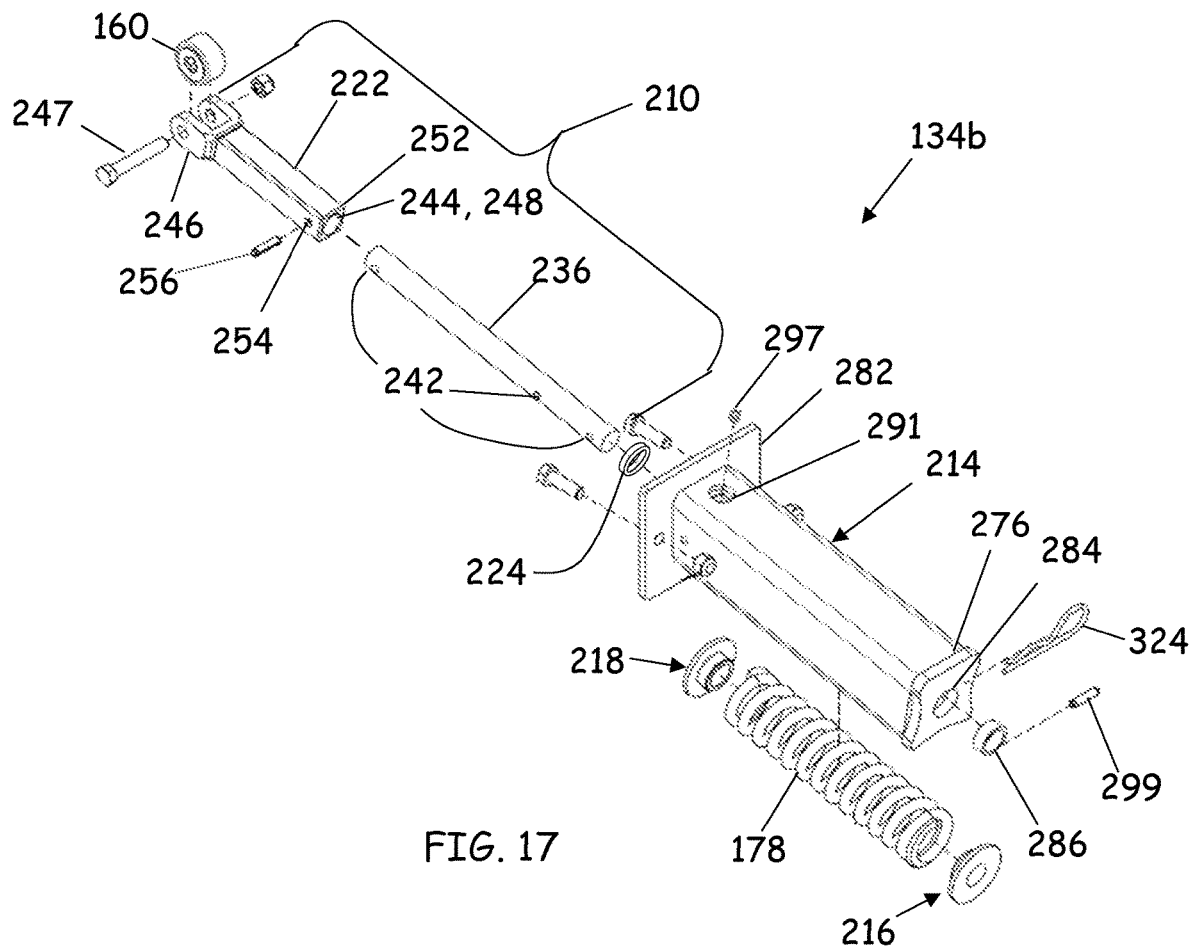
FIG. 17 is an exploded view of the cam follower assembly of FIG. 14 according to an embodiment of the disclosure.
Figure 18:
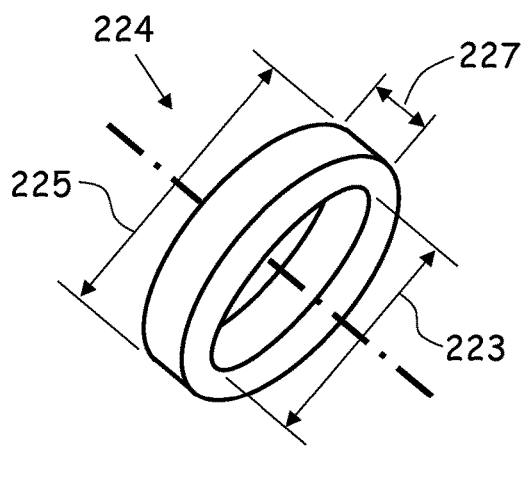
FIGS. 18 and 19 are perspective views of spacer shims according to an embodiment of the disclosure.

In FIG. 8, the cam-actuated lift assist mechanism 70*a* is depicted at the interim elevation angle $\theta$. The reaction force vector FR and reaction moment MR are replaced by an exerted force vector FE and a resultant exerted moment ME. The exerted force vector FE is imposed by operating personnel and is normal to the tongue axis 54. The exerted moment ME is a product of the exerted force vector FE and a distance DE from the rotation axis 44 to where the exerted force vector FE intersects the tongue axis 54 (for example, at the free end 56 of the tow bar 40). Other force vectors and moments are as described for FIG. 7, which are indicated with same-labeled reference characters. In addition, a brake system load moment ML is imposed on the tow bar 40. The brake system load moment ML is explained in greater detail attendant to FIGS. 15 and 16.

The magnitude of the cam follower moment MC is influenced by several parameters, including the biasing force vector FB, the trajectory 196 of the cam force vector FC, and the mechanical advantage between the biasing force vector FB and the cam force vector FC. For the depicted embodiment, the biasing element 172 is most relaxed in the tow bar down configuration 192 of FIG. 7, so that the biasing force vector FB is diminished relative to tow bar configurations at other elevation angles $\theta$. Also, for the depicted embodiment, a projected component FB' of the biasing force vector FB is further diminished because of an increase in a projection angle $\phi$ between the biasing force vector FB and the projected component FB'.

However, the follower arm 152 is rotated into an orientation where the projection ratio LL' to LF' is increased, thereby enhancing the mechanical advantage relative to the tow bar down configuration 192. Also, the cam surface 136 may be configured so that the trajectory 196 of the cam force vector FC exerted by the follower 160 increases the perpendicular distance DP relative to the tow bar down configuration 192, thereby increasing the cam follower moment MC. Accordingly, cam-actuated lift assist mechanisms 70 can be tailored to at least partially counter the reduction in the projected component FB' of biasing force vector FB.

In FIG. 9, the cam-actuated lift assist mechanism 70*a* is depicted at the tow bar up configuration 194. The various force vectors and moments originate as described for FIG. 8, some of which are indicated with same-labeled reference characters. In some embodiments, the center of gravity CG is disposed rearward of the rotation axis 44 (depicted) when in the tow bar up configuration 194, so that the weight moment MW acts in a counter-moment direction (counterclockwise in FIG. 9). In the tow bar up configuration 194, the brake system 100 is engaged with the running gear 194, which may substantially increase the brake system load moment ML. For the depicted embodiment, the projected FB' of the biasing force vector FB is further diminished relative to the configuration depicted in FIG. 8. However, the follower arm 152 is further rotated into an orientation where the projection ratio LL' to LF' is increased, thereby further enhancing the mechanical advantage relative to FIG. 8. Also in FIG. 9, the interaction between the follower 160 and the cam surface 136 increases the perpendicular distance DP relative to FIG. 8, thereby increasing the cam follower moment MC. Accordingly, cam-actuated lift assist mechanisms 70 can be tailored to at least partially counter the increase the brake system moment ML resulting from the setting of the brake system 100.

Referring to FIGS. 10 through 13, a cam-actuated lift assist mechanism 70b with cam 132b is depicted according to an embodiment of the disclosure. The cam 132b and cam-actuated lift assist mechanism 70b include some of the same components and attributes as the cam 132a and cam-actuated lift assist mechanism 70a, some of which are indicated with same-labeled reference characters. The cam-actuated lift assist mechanism 70b is distinguished as having a cam follower assembly 134b that includes a plunger assembly 210, wherein the biasing element 172 operates in compression along a fixed actuation axis 212 of the plunger assembly 210 to exert the cam force vector FC on the cam 132b. In some embodiments, the cam follower assembly 134b is mounted disposed within a through hole 213 formed on a front beam 215 of the chassis 32.

The magnitude of the cam follower moment MC is influenced primarily by the magnitude of the biasing force vector FB and the trajectory 196 of the cam force vector FC, the trajectory 196 determining the perpendicular distance DP. The magnitude of the biasing force vector FB is a function of a spring constant and a compression length LC of the biasing element 172, the compression length LC being a distance that the biasing element 172 is compressed relative to a relaxed or unloaded length. In some embodiments (e.g., for the pin 162 and roller 164 depicted), the trajectory 196 is normal to the cam surface 136 at the contact line of the cam follower 160. As such, the trajectory 196 of the cam force vector FC is determined by an incidence angle β between the actuation axis 212 and a normal vector to the cam surface 136 at the contact line, and the compression length LC is determined by a cam dimension A between the cam surface 136 and the rotation axis 44 that is concentric with the actuation axis 212.

The magnitude of the cam force vector FC is proportional to the product of the biasing force vector FB and the cosine of the incidence angle β. In the depicted embodiment of FIGS. 10 through 13, the cam dimension A imposes a compression length LC1 on the plunger assembly 210 and biasing element 172 along the actuation axis 212 in the tow bar down configuration 192 and a compression length LC2 in the intermediate tow bar configuration 193. In the depicted embodiment, the compression length LC2 is less than the compression length LC1 so that the biasing force vector FB exerted by the plunger assembly 210 is diminished as the tow bar approaches an upright position in the intermediate configuration 193 relative to the tow bar down configuration 192.

The cam 132b may be substantially similar to the cam 132a, with the respective cam-actuated lift mechanism 70a, 70b differing only in the rotational orientation of the cam 132a, 132b about the rotation axis 44 of the cross member 42. That is, each cam 132a, 132b is rotationally oriented to receive the cam force vector FC at the prescribed trajectory 196 relative to the rotation axis 44 for the given elevation angle θ. In this way, the prescribed cam force vectors FC (trajectory 196 and magnitude) can be tailored to generate the desired cam follower moment MC for countering the weight moment MW and the brake system moment ML as a function of the θ, as described attendant to FIGS. 7 through 9.

Functionally, the cam-actuated lift mechanism 70b generates the cam follower moment MC to counter the weight moment MW and brake system load moment ML in the same manner as the cam-actuated lift mechanism 70a, described attendant to FIGS. 7 through 9. The lever 152 of the cam-actuated lift mechanism 70a may, in some embodiments, extend below the chassis 32. The cam actuated lift mechanism 70b, implementing the plunger assembly 210 in lieu of the lever 152, may enable a more compact design relative to the cam-actuated lift mechanism 70a that is contained within the chassis 32. A cam-actuated lift mechanism 70 that is contained within the boundaries of the chassis 32 is less prone to damage that can occur when encountering obstacles that extend upward between the tires of the running gear 34 of the towed vehicle 30.

The standard cargo dolly 30b does not have a steering portion. Instead, the standard cargo dolly 30b includes swivel casters 198 that enable maneuvering. As such, the cam follower assembly 134b is depicted as being anchored to the chassis 32. The cam-actuated lift assist mechanism 70b may also be utilized on towed vehicles 30 that are steerable, such as the steerable cargo dolly 30a of FIGS. 1 and 2, in which case the cam follower assembly 134b is anchored to the steering portion 38. The skilled artisan, in light of this disclosure, understands that the cam-actuated lift assist mechanism 70b may be implemented mutatis mutandis with towed vehicles 30 that do not include a steering portion per se, for example, with standard dollies there the tow bar 40 is mounted directly to the chassis 32.

Referring to FIGS. 14 through 19, the cam follower assembly 134b is depicted in greater detail according to an embodiment of the disclosure. The cam follower assembly 134b may include several components and attributes of the cam follower assembly 134a, some of which are identified with same-labeled reference characters. The cam follower assembly 134b may include the plunger assembly 210, a housing 214, a proximal spring retainer 216, a distal spring retainer 218, a centering sleeve 222, the coil spring 178, and the cam follower 160. In some embodiments, the plunger assembly 210 includes a spacer shim 224. In some embodiments, the spring retainers 216, 218 are collars (depicted).

The plunger assembly 210 includes a proximal end 232 and a distal end 234, and may include a plunger rod 236 coupled to an extension 238. The plunger rod 236 includes a proximal end portion 235 and a distal end portion 237 and may define one or more lateral through holes 242. In some embodiments, the extension 238 defines a socket 244 configured to receive the plunger rod 236, and may include a yoke portion 246 at the distal end 234 configured for mounting the cam follower 160 thereon, for example with a fastener 247. The socket 244 defines an opening 248 that faces in a proximal direction 250 and is surrounded by a shoulder portion 252. In some embodiments, the extension 238 defines lateral apertures 254 (FIG. 17) on opposing sides of the socket 244. The lateral apertures 254 cooperate with one of the lateral through holes 242 of the plunger rod 236 to define a lateral passage 256 that passes through the plunger assembly 210.

Figure 19:
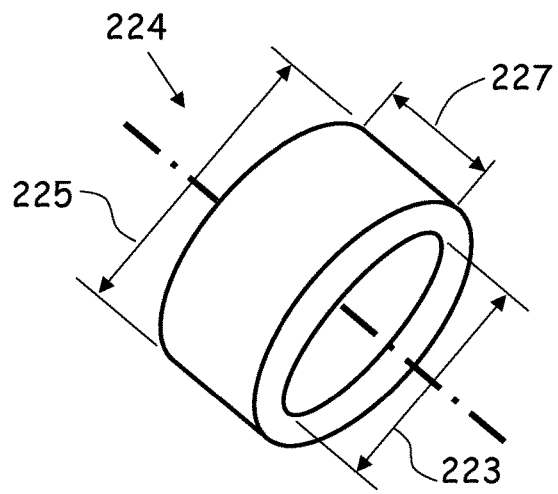

The spacer shim 224 defines an inner diameter 223, an outer diameter 225, and an axial length 227 (FIG. 19). The inner diameter 223 may be dimensioned for a close sliding fit over the plunger rod 236. In some embodiments, the outer diameter 225 of the spacer shim 224 does not exceed a minimum radial dimension of the shoulder portion 252.

The housing 214 includes a body portion 272 having proximal and distal ends 274 and 276. The body portion 272 may be capped with a centering plate 278 at the proximal end 274 and coupled to a mounting flange 282 at the distal end 276, the mounting flange 282 defining an opening 283. The centering plate 278 defines an aperture 284 which may house a bushing 286. In some embodiments, the bushing 286 is integrally lubricated. In some embodiments, the mounting flange 282 defines an acute angle α relative to the actuation axis 212. In some embodiments, the acute angle α is in a range of 60 degrees to 85 degrees inclusive. In some embodiments, the housing 214 defines an access opening 290 on one side of the body portion 272 that is dimensioned to accept various internal components of the cam follower assembly 134b, such as the coil spring 178 (uncompressed) and the spring retainers 216, 218. The housing 214 may also define one or more access ports 291 that pass through the body portion 272.

The spring retainers 216 and 218 may each include a tubular portion 292 with a flange portion 294 coupled at one end. The tubular portions 292 defines an inner diameter 296 configured for sliding engagement over the plunger rod 236. The tubular portions 292 are configured to fit within an inner diameter 298 of the coil spring 178.

The centering sleeve 222 is coupled to the housing 214 proximate the distal end 276, for example to the flange portion 282. The centering sleeve 222 is configured to accept the extension 238, for example with a close sliding fit. The centering sleeve 222 and extension 238 may define a polygonal cross-section, for example a rounded square (depicted). In some embodiments, the centering sleeve 222 includes a grease fitting 297. One of the access ports 291 of the housing 214 may be positioned for alignment with the grease fitting 297. The centering sleeve 222 and the aperture 284 of the centering plate 278 define and are concentric with the actuation axis 212.

In assembly, the plunger rod 236 is inserted into the socket 244 of the extension 238 via the opening 248 and translated and rotated within the socket 244 so that the lateral apertures 254 are in alignment with the lateral through hole 242 to define the lateral passage 256. The lateral passage 256 may be used for coupling the plunger rod 236 and the extension 238 together, for example with a roll pin 295 press fit into the passage 256. The roll pin 295 is dimensioned to bridge both of the lateral apertures 254, but not to extend beyond an outer surface of the extension 238.

The plunger rod 236 and the extension 238 as coupled is inserted into the housing 214 through the opening 283 of the mounting flange 282. With the proximal end 235 of the plunger rod 236 inserted in the housing 214 and positioned adjacent the access opening 290, the distal spring retainer 218, coil spring 178, and the proximal spring retainer 216 are slid in sequence over plunger rod 236, using the access opening 290 to access the proximal end 235. The spring retainers 216 and 218 are oriented so that the tubular portions 292 are inserted into the ends of the coil spring 178.

In some embodiments, the spacer shim 224 is slid over the plunger rod 236 for positioning adjacent the shoulder portion 252. The spacer shim 224, being dimensioned to slide into the centering sleeve 222, may be slid over the plunger rod 236 and inserted through the opening 283 with the plunger rod 236. Alternatively, the plunger rod 236 may be inserted into the housing 214 and the spacer shim 224 inserted through the access opening 290 for sliding over the plunger rod 236.

Having arranged, from proximal to distal, the proximal spring retainer 216, the coil spring 178, the distal spring retainer 218, and (optionally) the spacer shim 224 on the plunger rod 236 within the housing 214, the proximal end portion 235 of the plunger rod 236 is inserted through the aperture 284 of the centering plate 278. In some embodiments, with the distal end portion 236 of the plunger rod 236 extending through the aperture 284, a catch pin 299 is inserted into one of the lateral through holes 242 that is proximate the distal end portion 235, the catch pin 299 extending radially outward from the plunger rod 236. The catch pin 299 may be, for example, a roll pin, dowel, or a set screw. The cam follower 160 may be operatively coupled to the yoke portion 246 with the fastener 247.

Functionally, the spacer shim 224 is an optional component that can be implemented to increase the force of the cam follower assembly 134b in operation. The spacer shim 224, being disposed between the shoulder portion 252 of the extension 238 and the distal spring retainer 218, positions the distal spring retainer 218 proximal to the shoulder portion 252. For a given position of the cam follower 160 along the actuation axis 212 as determined by interaction with the cam 132b, the distal spring retainer 218 is positioned closer to the proximal spring retainer 216 when the spacer shim 224 is in assembly than when it is not in assembly. Accordingly, the coil spring 178 undergoes more compression, thereby generating more force. Likewise, the greater the axial length 227 of the spacer shim 224, the greater the forces generated by the cam follower assembly 134b in operation.

The polygonal cross section of the extension 238 and the centering sleeve 222 maintains the rotational orientation of the plunger assembly 210 for proper orientation of the follower during operation. The roll pin 295, being flush or receded with respect to the outer surface of the extension 238, enables passage of the extension 238 through and into the centering sleeve 222 during assembly and operation.

The catch pin 299 limits distal translation of the plunger assembly 210 relative to the housing 214, preventing the plunger assembly 210 from translating through centering plate 278 and into the housing 214. The tube portions 292 of the spring retainers 216, 218 act to center the rod 236 within the coil spring 178. The flange portions 294 capture the spring coil 178 and maintains the spring coil 178 in compression. The distal spring retainer 218 provides midspan centering and support of the plunger assembly 210.

The grease fitting 297 enables lubrication of the contact surfaces between the extension 238 and the centering sleeve 222, for example during maintenance procedures. The access port 291 adjacent the grease fitting 297 enables the grease fitting 297 to be accessed.

Figure 20:
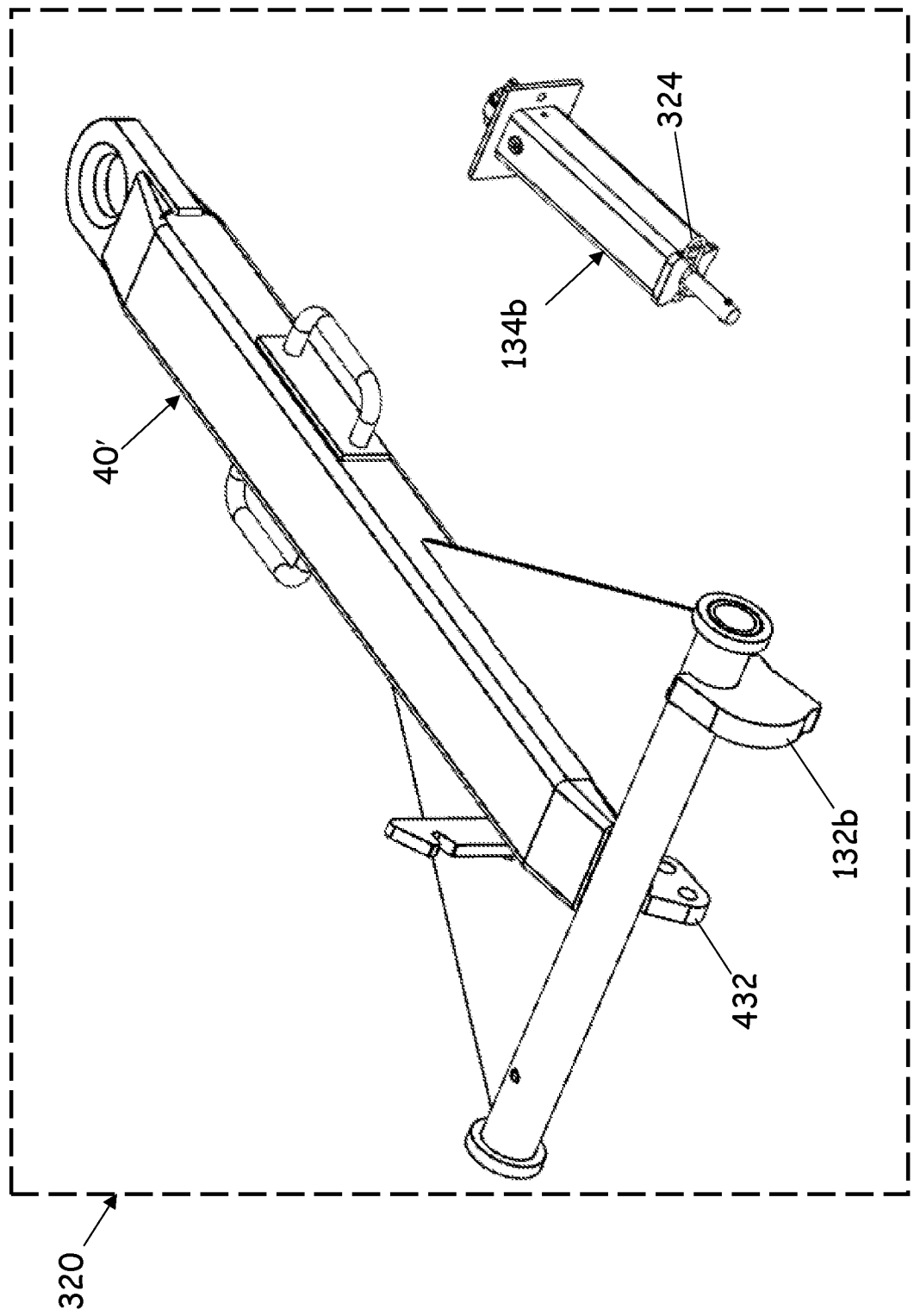
FIGS. 20 and 21 are depictions of a retrofit kit according to an embodiment of the disclosure.
Figure 21:
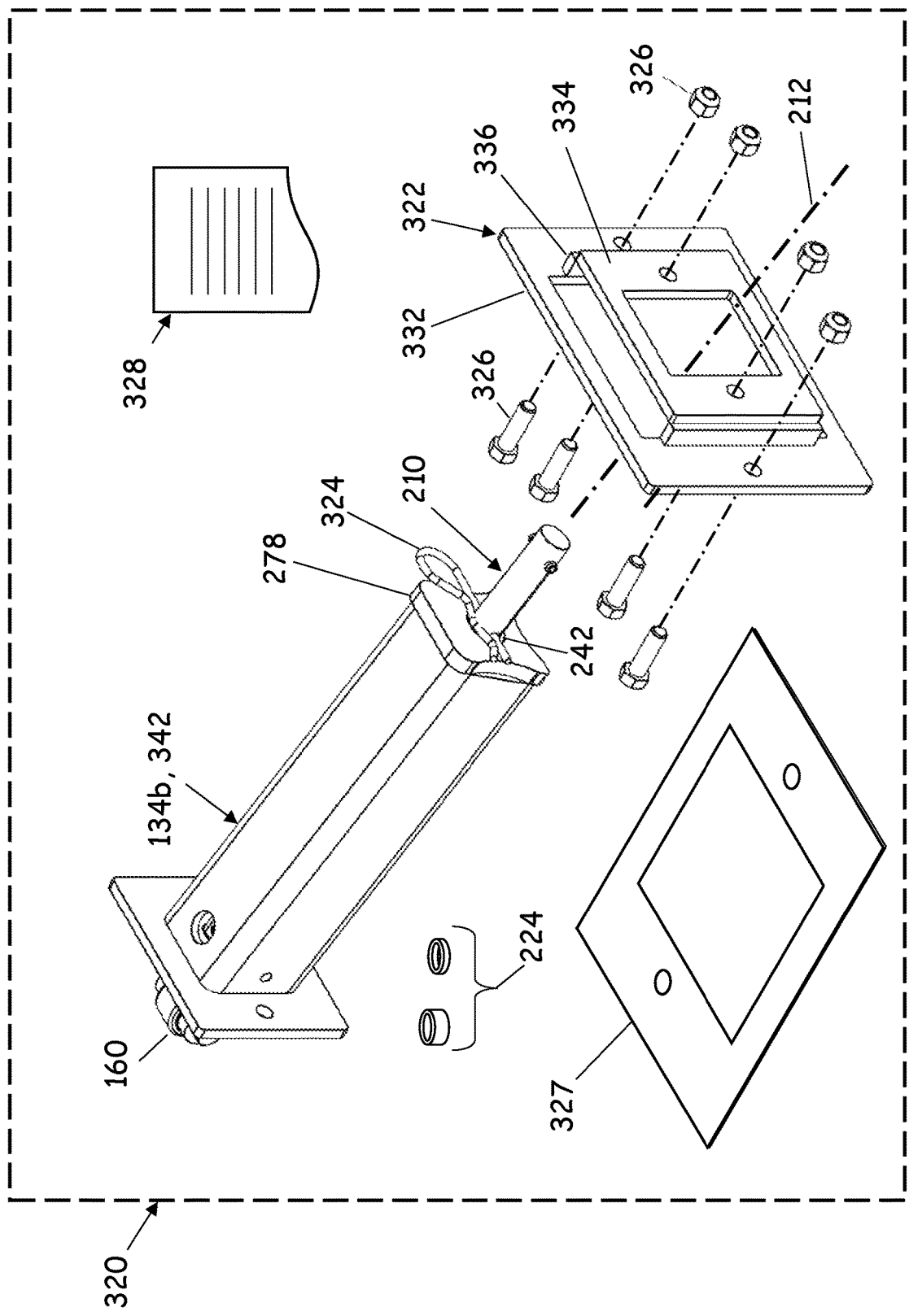

Referring to FIGS. 20 and 21, a retrofit kit 320 for retrofitting in-service dollies is depicted according to an embodiment of the disclosure. The retrofit kit 320 may include some or all of the following: the cam follower assembly 134b, an offset plate 322, a removable pin 324, associated fasteners 326, a hole template 327, and one or more spacer shims 224. The retrofit kit 320 may include instructions 328 for installation. In some embodiments, the retrofit kit 320 includes a retrofitted tow bar 40' with the cam 132 affixed thereto at the proper location and orientation for operation (FIG. 20).

The offset plate 322 includes an outer flange 332 and may include an inner flange 334. In some embodiments, the inner flange 334 is offset from the outer flange 332 with a spacer portion 336.

The removable pin 324 maintains the plunger assembly 210 in a retracted or partially retracted configuration 342. The plunger assembly 210 is retracted so that the corresponding lateral through hole 242 extends beyond the centering plate 278 and the removable pin 324 inserted therein. The plunger assembly 210, when released, seats the removable pin 324 against the centering plate 278, thereby maintaining the plunger assembly 210 in the retracted or partially retracted configuration 342.

In some embodiments, the location of the cam follower 160 when in the partially retracted configuration 342 can be selectively coupled to the cam 132b. That is, when in the partially retracted configuration 342, the cam 132b may engage the cam follower 160 when the tow bar 40 is at elevation angles θ that require a longer compression length LC (e.g., for LC1 of FIG. 11 with the tow bar 40 in the tow bar down configuration 192), and may disengage the follower at elevation angles that require a shorter compression length (e.g., for LC2 of FIG. 13 as the tow bar 40 approaches an upright position in the intermediate configuration 193). As such, during installation, the tow bar 40 can be oriented at an elevation angle θ where the cam follower 160 doesn't reach the cam 132b when in the partially retracted configuration 342. After the installation process is complete, the tow bar 40 can be oriented at a different elevation angle θ to engage the cam follower 160 and further retract the plunger assembly 210. The further retraction causes the removable pin 324 to disengage from the centering plate 278, thereby enabling easy removal of the removable pin 324. After removal of the removable pin 324, the cam follower assembly 134b is fully operational.

The instructions 328 are provided on a tangible, non-transitory medium, and may be physically included with the retrofit kit 320, such as on a printed document (depicted), compact disc, or flash drive. Non-limiting examples of a tangible, non-transitory medium include a paper document and computer-readable media including compact disc and magnetic storage devices (e.g., hard disk, flash drive, cartridge, floppy drive). The computer-readable media may be local or accessible over the internet. The instructions 328 may be complete on a single medium, or divided among two or more media. For example, some of the instructions 328 may be written on a paper document that instruct the user to access one or more of the steps of the method over the internet, the internet-accessible steps being stored on a computer-readable medium or media. The instructions 328 may embody the techniques and methods depicted or described herein using text, photos, videos, or a combination thereof to instruct and guide the user. The instructions may be in the form of written words, figures, photos, video presentations, or a combination thereof to instruct and guide the user.

In some embodiments, the instructions 328 may include some or all of the following steps:

Remove the existing tow bar from the towed vehicle 30.

Using the template 327 as a guide, form the through hole 213 in the chassis 32 of the towed vehicle 30, 30b and the mounting holes for passage of fasteners 326 for securing the mounting flange 282 to the chassis 32.

Insert the cam follower assembly 134b and, optionally, the offset plate 322 into the through-hole 213. Mount to the chassis 32 using the fasteners 326.

Mount the retrofitted bar 40' to the towed vehicle 30, 30b.

Rotate the retrofitted tow bar 40' to an elevation θ there the cam 132, 132b engages the cam follower assembly 134b. The engagement causes the plunger assembly 210 to translate in the proximal direction 250, separating the removable pin 324 from the body portion 272 of the cam follower assembly 134b.

Remove the removable pin 324 from the plunger assembly 210. The removal pin 324 may be discarded or kept for future disassembly or service.

Upon removal of the removable pin 324, the plunger assembly 210 is free to translate proximally and distally along its entire range within the cam follower assembly 134b. Formation of the through hole 213 may be accomplished, for example, with a cutting torch. In some embodiments, the cam follower assembly 134b is mounted to the chassis 32 such that the actuation axis 212 angles downward from the flange.

Functionally, the retracted or partially retracted configuration 342 enables installation of the cam follower assembly 134b without interference from the cam 132b. In some embodiments, the cam follower assembly 134b is provided in the retrofit kit 320 with the plunger assembly 210 in the retracted or partially retracted configuration 342. The offset plate 322 enables the cam follower assembly 134b to be positioned further in the rearward direction 118 relative to the front of the chassis 32 as may be required for proper engagement with the cam 132.

The foregoing assembly procedure for the cam follower assembly 134b is by way of example. The skilled artisan, in light of this disclosure, may recognize other procedures and techniques for assembling the cam follower assembly 134b.

Figure 22:
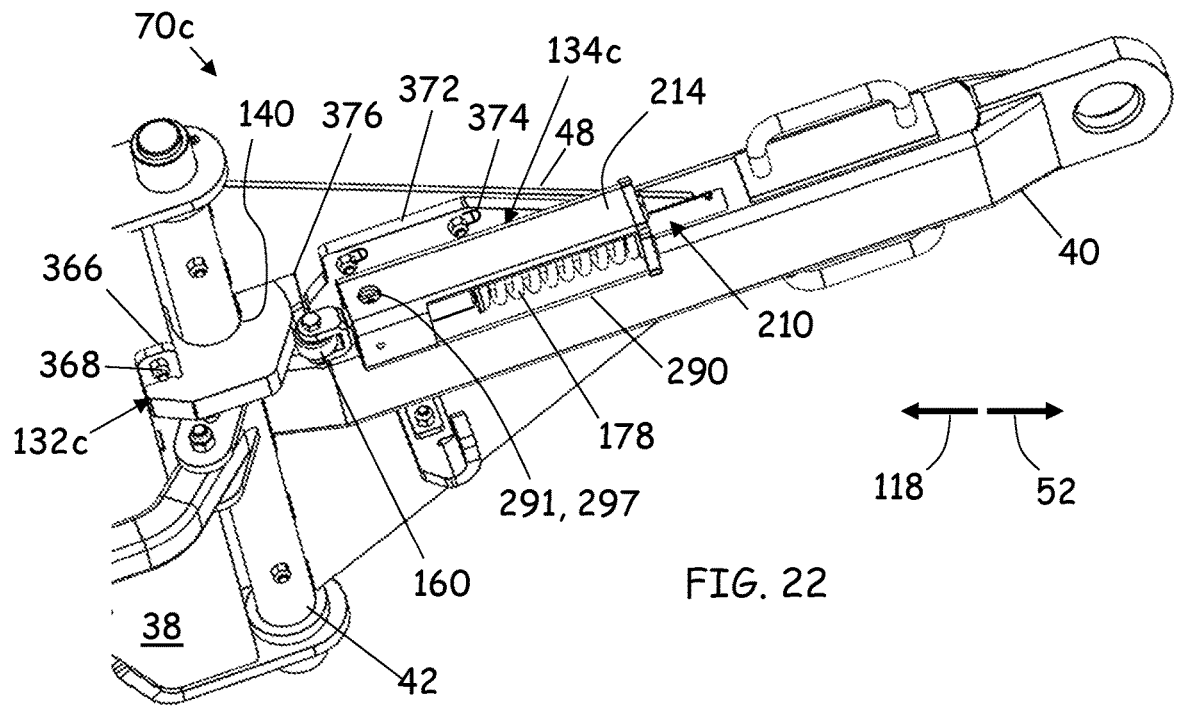
FIG. 22 is a cam-actuated lift assist mechanism installed on a dolly according to an embodiment of the disclosure.

Referring to FIG. 22, a cam-actuated lift assist mechanism 70c is depicted according to an embodiment of the disclosure. The cam-actuated lift assist mechanism 70c includes many of the same components and attributes as the cam-actuated lift assist mechanisms 70a, some of which are identified with same-labeled reference characters. The cam-actuated lift assist mechanism 70c includes a cam 132c that mounts to the steering portion 38 (or chassis 32) and a cam follower assembly 134c that mounts to the towbar 40, the cam 132c and tow bar 40 being configured to enable rotation of the tow bar 40 about the cam 132c while the cam 132c remains stationary relative to the steering portion 38 or chassis 32.

For the cam 132c, the cam slot 140 defines a clearance dimension 364 (FIG. 23) that is greater than a diameter of the cross member 42. In some embodiments, one or more mounting tabs 366 are affixed to the cam 132c, for example by welding. The cam 132c may be coupled to the steering portion 38 (depicted), or, in some embodiments, directly to the chassis 32. Coupling of the cam 132c to the steering portion 38 or chassis 32 may be accomplished, for example, with the mounting tabs 366 and fasteners 368.

In some embodiments, the cam follower assembly 134c is a modified version of the cam follower assembly 134b. The modifications may include elimination of the mounting flange 282 and the addition of a mounting plate 372 coupled to the housing 214, for example by welding. The mounting plate 372 may include mounting slots 374. The plunger assembly 210 and housing 214 may be oriented for lateral access of the grease fitting 297 via the access aperture 291.

The tow bar 40 may define a gusset slot 376 in the gusset plate 48. The gusset slot 376 extends from the cross member 42 proximate the location of the cam 132c, such that the cam 132c may extend through the gusset slot 376 without interference.

Functionally, for the cam-actuated lift assist mechanism 70c, the cam 132c remains stationary relative to the steering portion 38 and the cam follower assembly 134c rotates elevationally with the tow bar 40. This is in contrast to the cam-actuated lift assist mechanisms 70a and 70b, where the cam follower assemblies 134a and 134b are stationary relative to the steering portion 38 and cams 132a and 132b that rotate with the tow bar 40. The principle of operation of the lift assist mechanism 70c is the same as described variously throughout this disclosure for the lift assist mechanisms 70a and 70b. The clearance dimension 364 of the cam slot 140 enables the cam 132c to remain stationary while the cross member 42 rotates within the cam slot 140. The gusset slot 376 enables the tow bar 40 to rotate without interference from the cam 132c.

The mounting slots 374 enable the position of the cam follower assembly 134c to be selectively adjusted relative to the cam 132c. As such, the force exerted on the cam 132c by the cam follower assembly 134c can be adjusted according to preference, akin to the function of the spacer shims 224.

Figure 23:
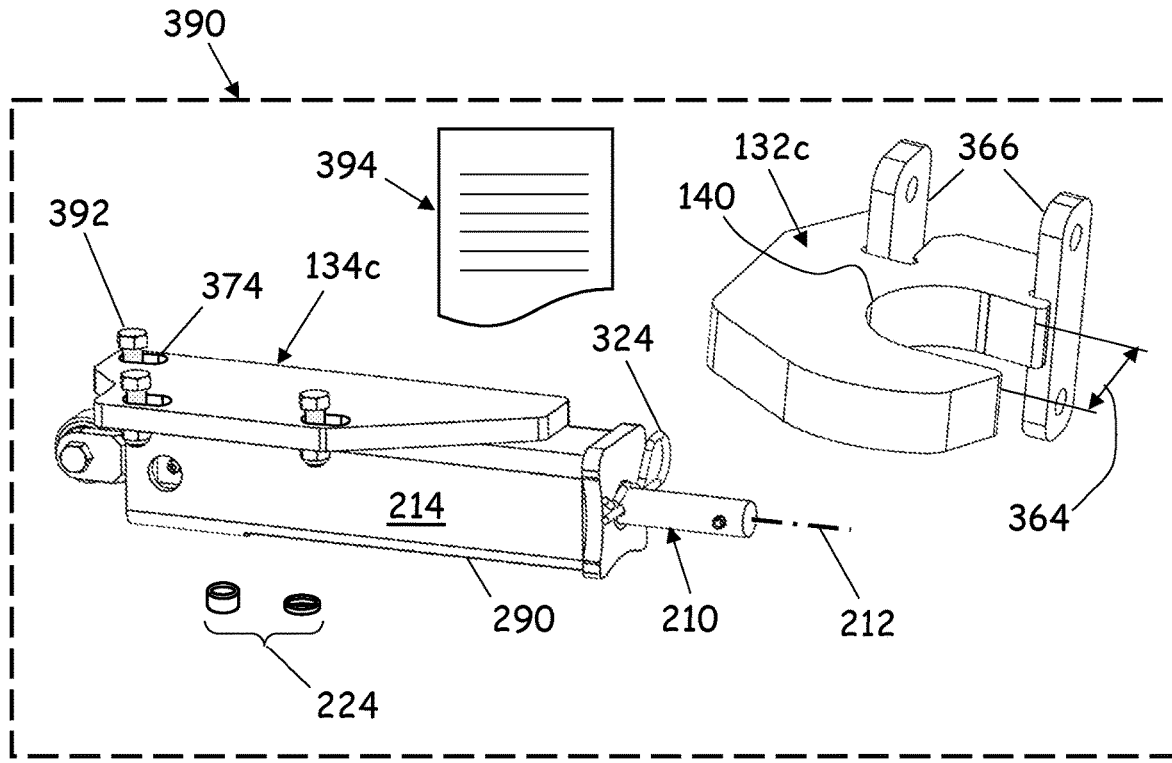
FIG. 23 is a retrofit kit according to an embodiment of the disclosure.

Referring to FIG. 23, a retrofit kit 390 for retrofitting in-service dollies is depicted according to an embodiment of the disclosure. The retrofit kit 390 may include the cam follower assembly 134c, the cam 132c, the removable pin 324, associated fasteners 392, and one or more spacer shims 224. The retrofit kit 390 may include instructions 394 for installation.

The operation and function of the removable pin 324 is the same as described for the retrofit kit 320. The instructions 394 may be provided on a tangible, non-transitory medium, such as described for the instructions 328 of the retrofit kit 320.

In reference to cam follower assemblies 134b and 134c, "proximal" refers a direction having no origin that progresses sequentially through the centering plate 278 and centering sleeve 222. "Distal" refers to a direction opposite the proximal direction. "Lateral" refers to a direction that is orthogonal to the proximal and distal directions.

Figure 24:
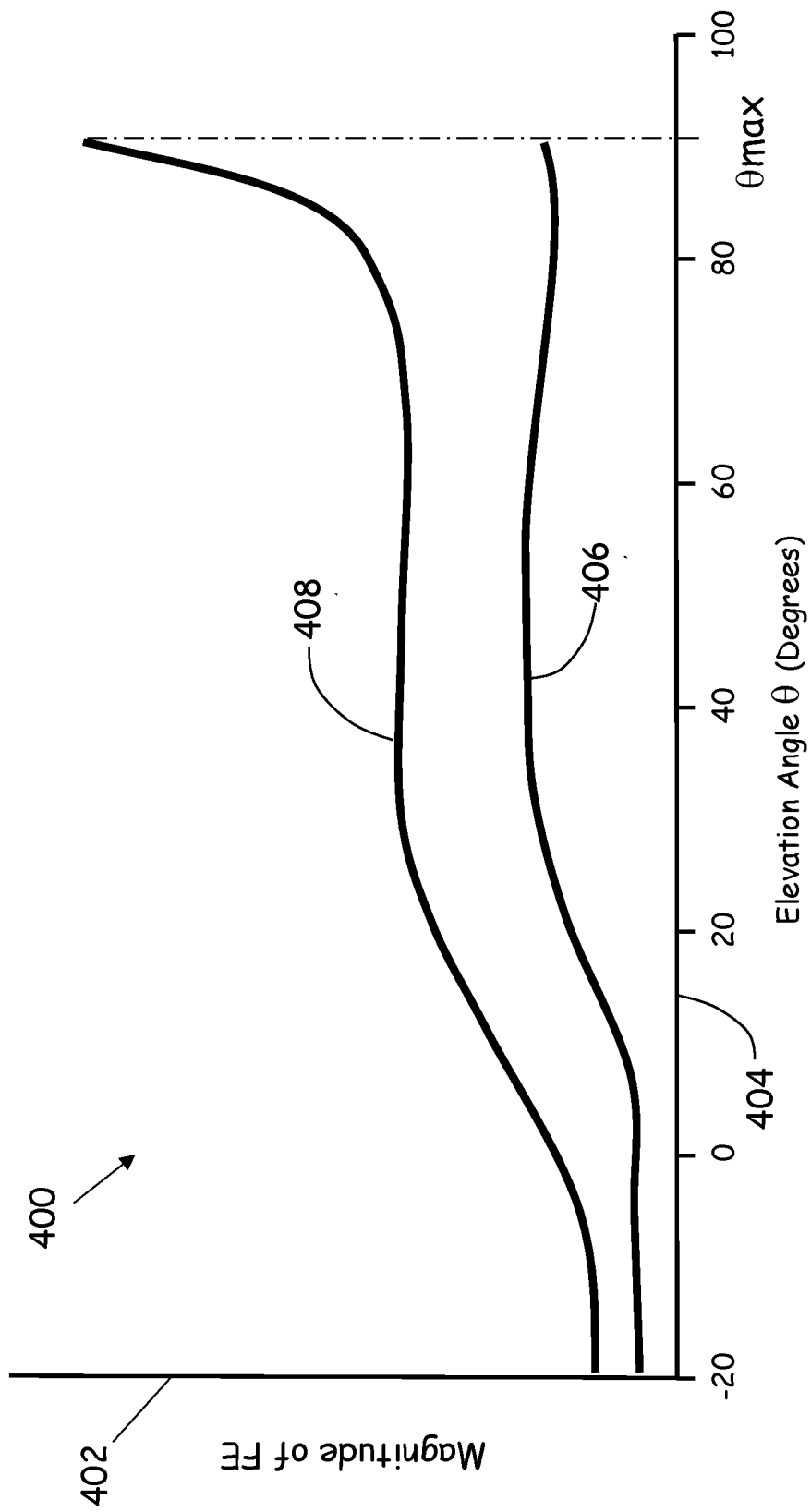
FIG. 24 is a graph of a characteristic exerted force-versus-position profile for raising a lift assisted tow bar from the tow bar down configuration to the tow bar up configuration in comparison to a counterpart conventional tow bar assembly without the lift assist mechanism according to embodiments of the disclosure.

Referring to FIG. 24, an exerted force-versus-position comparison 400 for raising the tow bar assembly 36 with and without the cam-actuated lift assist mechanism 70 is depicted according to an embodiment of the disclosure. The comparison 400 presents the magnitude of the exerted force FE at an ordinate 402 and the elevation angle $\theta$ at an abscissa 404. An assisted force profile 406 represents the magnitude of the exerted force vector FE for a prototype of the cam-actuated lift assist mechanism 70a, but is representative of cam-actuated lift assist mechanisms 70 generally. An unassisted force profile 408 represents the exerted force vector FE for the same prototype, but with the cam-actuated lift assist mechanism 70 disengaged. The elevation angles $\theta$ of profiles 406 and 408 range from the tow bar down configuration 192 ($\theta$ approximately −20 degrees) to the tow bar up configuration 194 ($\theta$max approximately 90 degrees). The data from which the profiles 406 and 408 are derived were taken with a hand held spring scale attached to the free end 56 of the tow bar 40 and maintained substantially perpendicular to the tongue axis 54 at known vertical elevations from the tow bar down configuration 192.

Figure 25:
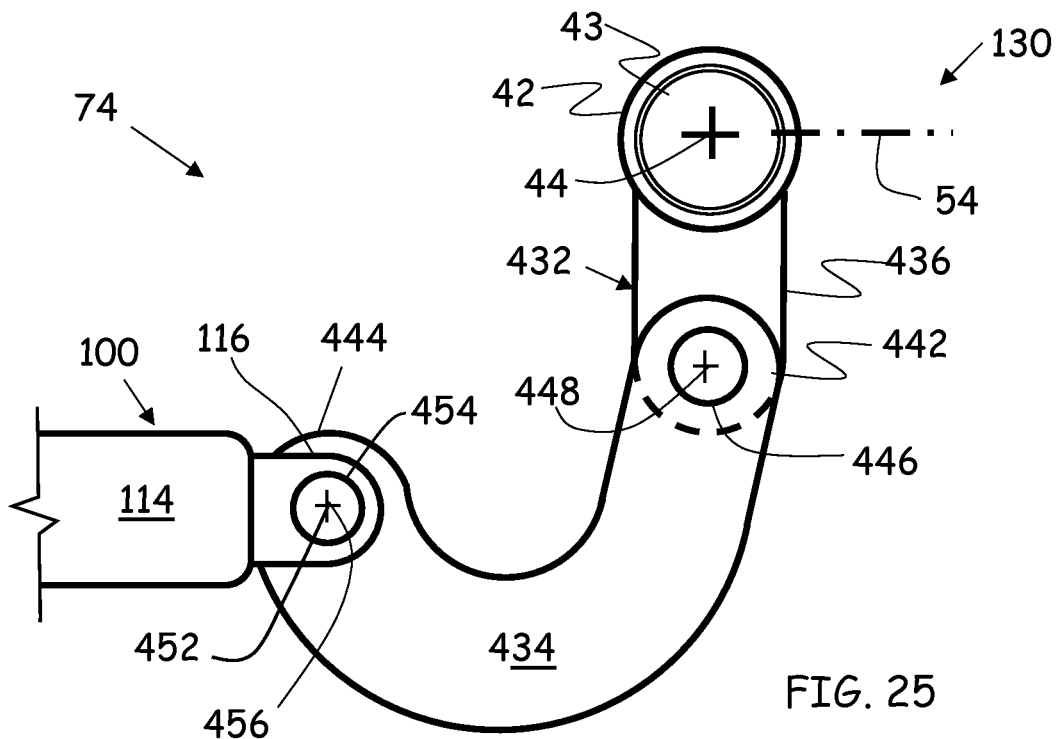
FIG. 25 is a side elevational view of the self-securing brake actuation mechanism as seen at plane XXV of FIG. 4 according to an embodiment of the disclosure.

The unassisted force profile 408 indicates an increasing magnitude for the exerted force vector FE at the lower elevation angles $\theta$ followed by substantial plateauing of the force-versus-elevation angle across the midrange elevation angles $\theta$. These portions of the unassisted force profile 408 represent the weight moment MW and the brake system load moment ML required to overcome load forces FL. The brake system load forces FL and moments ML are described in greater detail attendant to FIGS. 25 and 26.

Inspection of FIGS. 7 through 9 reveals that the horizontal distance DW between the weight force vector FW and the rotation axis 44 decreases with increasing elevation angles $\theta$ greater than zero, which actually causes the magnitude of the weight moment MW to decrease with increasing elevation angle $\theta$. Accordingly, because the exerted force FE to trend upward beyond the elevation angle $\theta$ of zero, it appears that the brake system load forces FL required to actuate the brake system 100 impose an increase in the brake system load moments ML that is greater than the decrease in the magnitude of the weight moment MW.

As the elevation angle $\theta$ approaches the tow bar up configuration ($\theta=\theta$max), the magnitude of the exerted force FE for the unassisted profile 408 increases sharply. The increase is caused by setting the brake system 100, for example, engagement of the 106 brake assembly with the tires 108 (FIG. 5). The increased force required by the brake system 100 for setting the brakes is reflected by the increase in the magnitude of the FE proximate the maximum elevation angle $\theta$max.

The assisted force profile 406 illustrates how the cam-actuated lift assist mechanism can reduce the exerted forces required to rotate the tow bar 40 upward and set the brake system 100. The cam follower moment MC acts to counter the weight moment MW and the brake system load moment ML, as evinced by the reduced magnitude of the assisted force profile 408 across the low and midrange elevation angles $\theta$ relative to the unassisted force profile 406. The cam-actuated lift assist mechanism 70 can also be tailored to substantially reduce the magnitude of the exertion force FE, as illustrated in FIG. 24. For the prototype of the comparison 400, the reduction in the magnitude of the exertion force FE relative to the unassisted system is typically 40% to 60% across the low and midrange elevation angles $\theta$, and approaches 80% during the setting of the brake system 100.

Referring to FIGS. 25 and 26 and again to FIG. 4, the self-securing brake actuation mechanism 74 is depicted according to an embodiment of the disclosure. The self-securing brake actuation mechanism 74 is depicted in the towing configuration 130 and in the tow bar up configuration 194 in FIGS. 25 and 26, respectively. The self-securing brake actuation mechanism 74 includes a yoke assembly 432 that extends from the cross member 42, and a contoured linkage 434 that depends from the yoke assembly 432. The brake system 100 is coupled to and extends rearward from the self-securing brake actuation mechanism 74. The yoke assembly 432 includes at least one standoff 436 and is affixed to the cross member 42 in fixed relationship, for example by welding. In some embodiments, the at least one standoff 436 extends substantially downward when the tow bar assembly 36 is in the tow bar down or towing configurations 192, 130.

The contoured linkage 434 includes a forward end 442 and a rearward end 444. The forward end 442 is pivotally connected to the yoke assembly 432, for example with a yoke pivot pin 446. The yoke assembly 432 defines a yoke pivot axis 448 about which the forward end 442 of the contoured linkage 434 rotates, which represents a centered location for any applied or reactive force vector between the contoured linkage 434 and the yoke assembly 432. The forces exerted between the brake system 100 and the rearward end 444 of the contoured linkage 434 intersect at a junction 452. In the depicted embodiment, the rearward end 444 of the contoured linkage 434 is coupled to the spring module 114 of the brake system 100 with a pivot pin 454, so that the junction 452 is defined by a central axis 456 of the pivot pin 454. A vector direction axis 458 is defined between the yoke pivot axis 448 and the junction 452. The vector direction axis 458 establishes the direction of any reaction force vectors centered at the yoke pivot axis 448 and the junction 452.

Other connection arrangements between the brake system 100 and the contoured linkage 434 are contemplated, including a rigid connection (not depicted) between the spring module 114 and the contoured linkage 434, or a cable (not depicted) or the tie rod 104 directly connected to the contoured linkage 434.

The contoured linkage 434 is so-named because it is shaped or "contoured" to at least partially surround the cross bar 42 when the tow bar assembly 36 is in the tow bar up configuration 194. In some embodiments, the contoured linkage 434 is configured to partially surround but not contact the cross bar 42 during operation. The depicted contoured linkage 434 is an arcuate-shaped link 462, but other overall shapes are contemplated that provide the same function. Examples of alternative shapes (not depicted) for the contoured linkage 434 include: an L-shape or V-shape; a rectangular plate that defines a notch that extends downward from an upper edge; straight members that are rigidly affixed to each other, for example by welding, to define an interior boundary of straight line segments; and plate that defines a closed circle or oval that surrounds the cross member, the closed circle or oval being large enough to permit travel of the plate from a position in the tow bar down configuration to a position in the tow bar up configuration without substantial contact with the cross member 42.

Figure 26:
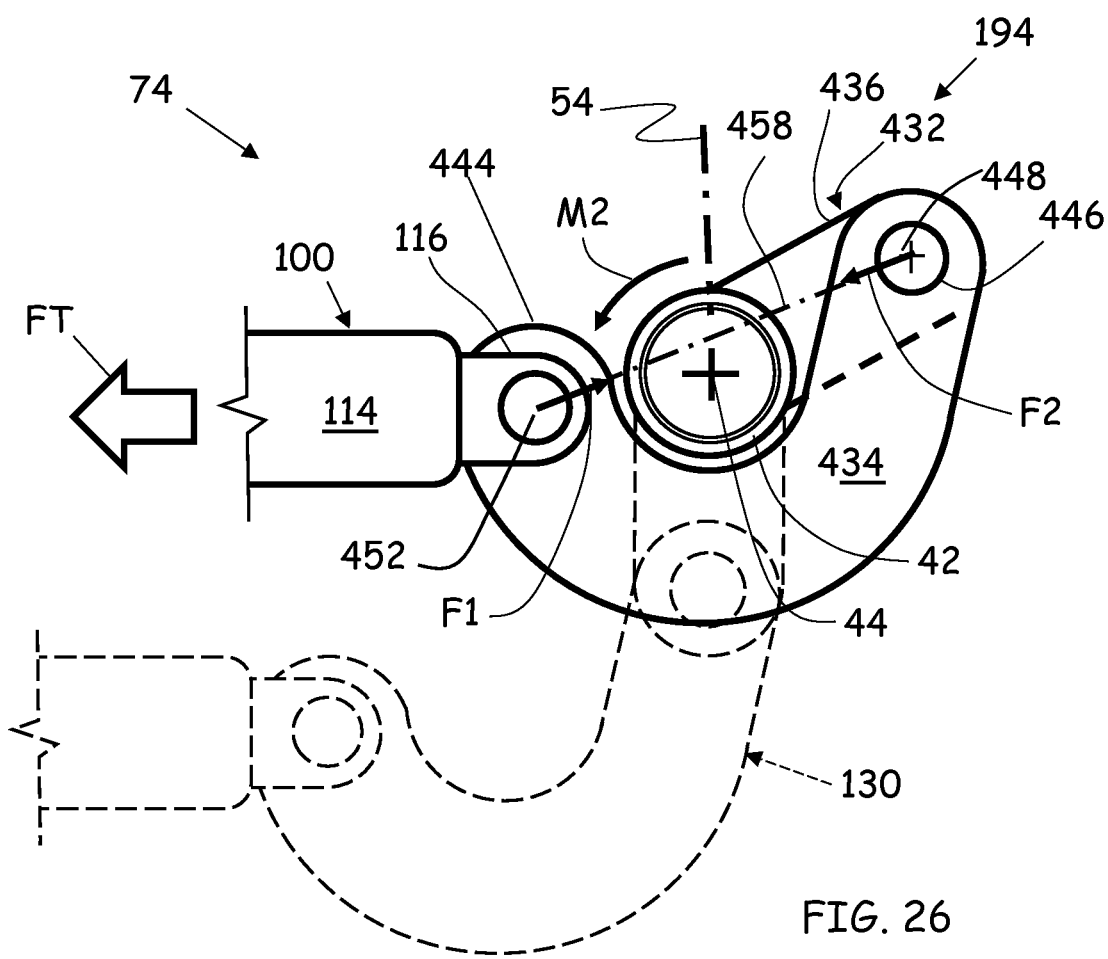
FIG. 26 is a force schematic of the self-securing brake actuation mechanism of FIG. 4 securing the tow bar in an upward configuration with an arcuate link according to an embodiment of the disclosure.

In operation, the self-securing brake actuation mechanism 74 acts to secure the tow bar assembly 36 in the tow bar up configuration 194. In the towing configuration 130 of FIG. 15, the self-securing brake actuation mechanism 74 is substantially at rest. That is, the self-securing brake actuation mechanism 74 does not influence the orientation of the tow bar to any significant degree when in the towing configuration 130. When the tow bar 40 is rotated into the tow bar up configuration 194, the forward end 442 of the contoured linkage 434 is rotated forward and upward by the yoke assembly 432 so that the yoke pivot axis 448 is at a higher elevation than the rotation axis 44 of the cross member 42. The rearward end 444 of the contoured linkage 434 is also elevated forward and upward, so that the contoured linkage 434 partially surrounds the cross member 42. The forward and upward movement is illustrated in FIG. 26, with the components of the self-securing brake actuation mechanism 74 and spring module 114 in the towing configuration 130 depicted in phantom. In the depicted embodiment, the contoured linkage 434 is actually rotated upward about the linkage assembly 116 proximate the rear tires 108 (FIG. 5). Because of the long radius between the linkage assembly 116 and the rearward end 444 of the contoured linkage 434, the angular orientation (pitch) of the contoured linkage 434 remains substantially the same in both the towed and the tow bar up configurations 130, 194.

The forward movement of the contoured linkage 434 engages the brake system 100 with the running gear 34 to impose a tension force FT on the spring module 114 and tie rod 104. The tension force FT causes a first reaction force vector F1 at the junction 452 and an equal and opposite second reaction force vector F2 at the yoke pivot axis 448. The contoured linkage 434 is held in equilibrium about the cross member 42 by the tension force FT, without need of contacting the cross member 42.

The directions of the reaction force vectors F1 and F2 are along the vector direction axis 458. For embodiments where the vector direction axis 458 extends above the rotation axis 44, the second reaction force vector F2 imparts a counter moment M2 on the cross member 42 that at least partially counters the brake system load moment ML. In some embodiments, the counter moment M2 is sufficient to maintain the tow bar assembly 36 in the tow bar up configuration 194. In other embodiments, the counter moment M2 and the cam follower moment MC combine to maintain the tow bar assembly 36 in the tow bar up configuration 194. Accordingly, self-securing brake actuation mechanism 74 may replace or provide redundancy for the function of the bar 58 and the latch hook 62.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of U.S.C. 112(f) are not to be invoked unless the specific terms "means for" or "step for" are recited in the respective claim.

What is claimed is:

1. A lift assisted tow bar system, comprising:
a tow bar pivotally coupled to a towed vehicle to define a tow bar rotation axis, said tow bar being articulable about said tow bar rotation axis;
a cam coupled with one of said tow bar and said towed vehicle, said cam including a cam surface that at least partially surrounds said tow bar rotation axis; and
a cam follower assembly, including a cam follower contacting said cam surface and a plunger assembly configured to exert a cam force vector along an actuation axis that is imposed on said cam surface, wherein said plunger assembly includes a plunger rod coupled to an extension, said plunger rod extending through an aperture defined by a centering plate of a proximal end of a housing of the cam follower assembly, said extension extending through a centering sleeve disposed proximate a distal end of said housing, said cam follower being disposed at a distal end of said extension, wherein said cam follower is configured to follow along said cam surface and exert said cam force vector on said cam for generation of a counter-moment that at least partially counters moments encountered about said tow bar rotation axis during operation of said tow bar.

2. The lift assisted tow bar system of claim 1, wherein said cam surface is configured to vary a counter-moment arm of said counter-moment about said tow bar rotation axis as said cam follower follows along said cam surface.

3. The lift assisted tow bar system of claim 1, wherein said cam surface defines an arcuate depression for registration of said cam follower when said tow bar is in a tow bar up configuration.

4. The lift assisted tow bar system of claim 1, wherein said cam surface defines stops at terminations of said cam surface.

5. The lift assisted tow bar system of claim 1, comprising a brake system coupled to said tow bar, said brake system being engaged when said tow bar is in a substantially vertical orientation, wherein said cam surface and a biasing element are configured to generate said counter-moment to substantially counter a brake system load moment about said tow bar rotation axis when said brake system is engaged.

6. The lift assisted tow bar system of claim 1, wherein said cam is in a fixed spatial relationship relative to said tow bar, wherein said cam follower assembly includes a follower arm pivotally rotatable about a follower arm pivot axis, said follower arm including a follower end portion that extends from said follower arm pivot axis, and wherein said follower arm includes a lever end portion that extends from said follower arm pivot axis, a biasing element being coupled to said lever end portion.

7. The lift assisted tow bar system of claim 6, wherein:
said follower end portion defines a follower arm length extending from said follower arm pivot axis to a central axis of said cam follower; and
said lever end portion defines a lever arm length extending from said follower arm pivot axis to an anchoring point of said biasing element on said follower arm;
wherein a ratio of said lever arm length to said follower arm length is in a range of 2:1 to 3:1 inclusive.

8. The lift assisted tow bar system of claim 6, wherein said follower arm is a bell crank.

9. The lift assisted tow bar system of claim 8, wherein said tow bar, said follower arm, and said plunger assembly are coupled to a steering assembly, said steering assembly being coupled to a running gear of said towed vehicle for steering of said towed vehicle.

10. The lift assisted tow bar system of claim 1, wherein said centering sleeve includes a grease fitting, and wherein said housing defines an access port adjacent said grease fitting.

11. The lift assisted tow bar system of claim 1, wherein said centering sleeve and said extension define a polygonal cross-section normal to said actuation axis.

12. The lift assisted tow bar system of claim 1, wherein said is plunger assembly comprises a compression spring that surrounds said plunger rod.

13. The lift assisted tow bar system of claim 12, wherein said compression spring includes a distal end and is captured at said distal end by a distal spring retainer.

14. The lift assisted tow bar system of claim 1, wherein said plunger rod defines a first lateral through hole that is proximate a distal end of said plunger rod, said plunger assembly including a catch pin disposed in said first lateral through hole.

15. The lift assisted tow bar system of claim 14, wherein said plunger rod defines a second lateral through hole that is distal to said first lateral through hole, said second lateral through hole being configured to receive a removable pin for seating against said housing.

16. The lift assisted tow bar system of claim 15, wherein said removable pin being selectively removable from said second lateral through hole to enable said second lateral through hole to pass into said housing.

17. The lift assisted tow bar system of claim 1, wherein a spacer shim disposed adjacent a proximal end of said extension, wherein said spacer shim is captured between said extension and a distal spring retainer, wherein said distal spring retainer is a collar, and wherein said spacer shim is dimensioned to pass into said centering sleeve.

18. The lift assisted tow bar system of claim 1, wherein a mounting flange is disposed at said distal end of a body of said housing, wherein said mounting flange defining an acute angle relative to said actuation axis, and wherein said acute angle is in a range of 60 degrees to 85 degrees inclusive.

19. The lift assisted tow bar system of claim 1, wherein said towed vehicle includes a chassis, said cam being coupled to and in a fixed spatial relationship relative to said chassis.

20. The lift assisted tow bar system of claim 1, wherein said towed vehicle includes a steering section and a chassis, said steering section being pivotally coupled to said chassis, said cam being coupled to and in a fixed spatial relationship with said steering section.

* * * * *